United States Patent
Dhanda et al.

(10) Patent No.: US 11,284,470 B2
(45) Date of Patent: Mar. 22, 2022

(54) USER EQUIPMENT SPECIFIC DISCONTINUOUS RECEPTION CYCLE

(71) Applicant: QUALCOMM Incorporated, San Diego, CA (US)

(72) Inventors: Mungal Singh Dhanda, Slough (GB); Luis Fernando Brisson Lopes, Swindon (GB); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/737,348

(22) Filed: Jan. 8, 2020

(65) Prior Publication Data
US 2020/0245396 A1 Jul. 30, 2020

Related U.S. Application Data

(60) Provisional application No. 62/797,911, filed on Jan. 28, 2019.

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0229* (2013.01); *H04W 68/005* (2013.01); *H04W 68/02* (2013.01)

(58) Field of Classification Search
CPC ............. H04W 76/28; H04W 52/0229; H04W 68/005; H04W 68/02; H04W 88/02; H04W 88/08; Y02D 30/70
(Continued)

(56) References Cited

U.S. PATENT DOCUMENTS

2014/0098761 A1* 4/2014 Lee ........................ H04W 24/02 370/329
2014/0119255 A1* 5/2014 Vannithamby ........ H04L 5/0037 370/311
(Continued)

FOREIGN PATENT DOCUMENTS

CN 003119144 * 1/2017 ............ H04W 68/00
EP 3119144 A1 1/2017

OTHER PUBLICATIONS

3GPP TS 36.300 v15.4.0, release 15, (Year: 2018).*
(Continued)

*Primary Examiner* — Inder P Mehra
(74) *Attorney, Agent, or Firm* — Procopio, Cory, Hargreaves & Savitch; Nerrie M. Zohn

(57) ABSTRACT

Improvements are provided to the paging process for an eMTC UE by allowing a base station and the UE to apply a UE-specific DRX cycle for paging, from one set of DRX cycles, when the UE is operating in non-CE mode and apply another UE-specific DRX cycle, from a more restricted set of UE-specific DRX cycles, when the UE is operating in a CE mode. A UE may report and apply certain UE-specific DRX cycles under non-CE mode, and may change a UE-specific DRX cycle to one from a more restricted set when operating in CE mode. Similarly, base stations may receive the reported UE-specific DRX cycle and apply that UE-specific DRX cycle for paging the UE in non-CE mode, while applying a different UE-specific DRX cycle from the more restrictive set for paging the UE in CE mode.

30 Claims, 14 Drawing Sheets

(51) Int. Cl.
*H04W 68/00* (2009.01)
*H04W 68/02* (2009.01)

(58) Field of Classification Search
USPC .......................................................... 370/311
See application file for complete search history.

(56) References Cited

U.S. PATENT DOCUMENTS

| | | | |
|---|---|---|---|
| 2016/0066296 A1* | 3/2016 | Su | H04W 76/28 455/458 |
| 2016/0192433 A1* | 6/2016 | Deenoo | H04W 72/046 370/329 |
| 2017/0295546 A1* | 10/2017 | Young | H04W 76/28 |
| 2020/0029385 A1* | 1/2020 | Bergstrom | H04W 76/27 |

OTHER PUBLICATIONS

"3rd Generation Partnership Project, Technical Specification Group Radio Access Network, Evolved Universal Terrestrial Radio Access (E-UTRA) and Evolved Universal Terrestrial Radio Access Network (E-UTRAN),Overall description, Stage 2 (Release 15)", 3GPP Draft 36300-F40, 3rd Generation Partnership Project (3GPP), Mobile Competence Centre, 650, Route Des Lucioles, F-06921 Sophia-Antipolis Cedex, France, Jan. 15, 2019 (Jan. 15, 2019), XP051686899, 363 pages.

Huawei, et al., "Paging in Enhanced Coverage Mode", 3GPP Draft, R2-140282, Paging in Enhanced Coverage Mode, 3rd Generation Partnership Project (3GPP), Mobile Competence Centre, 650, Route Des Lucioles, F-06921 Sophia-Antipolis Cedex, France, vol. RAN WG2, No. Prague, Czech, Republic, Feb. 10, 2014-Feb. 14, 2014, Feb. 9, 2014 (Feb. 9, 2014), pp. 1-3, XP050791677, Retrieved from the Internet: URL: http://www.3gpp.org/ftp/Meetings_3GPP_SYNC/RAN2/Docs/. [retrieved on Feb. 9, 2014] the whole document.

International Search Report and Written Opinion—PCT/US2020/012923—ISA/EPO—dated May 6, 2020.

Sequans Communications: "Paging with fractional nB value", 3GPP Draft, R2-1817338, Paging with fractional nB value, 3rd Generation Partnership Project (3GPP), Mobile Competence Centre, 650, Route Des Lucioles, F-06921 Sophia-Antipolis Cedex, France, vol. RAN WG2, No. Spokane. USA, Nov. 12, 2018-Nov. 16, 2018, Nov. 12, 2018 (Nov. 12, 2018), pp. 1-2, XP051556871, Retrieved from the Internet: URL: http://www.3gpp.org/ftp/Meetings%5F3GPP%5FSYNC/RAN2/Docs/R2%2D1817338%2Ezip. [retrieved on Nov. 12, 2018] the whole document.

* cited by examiner

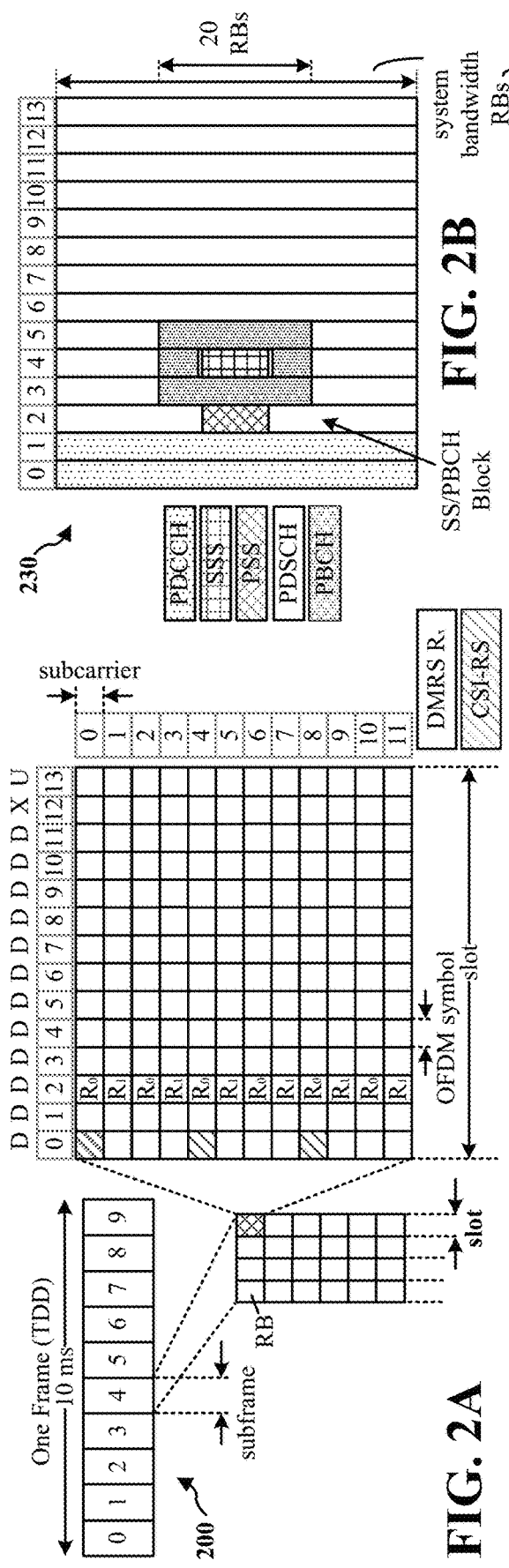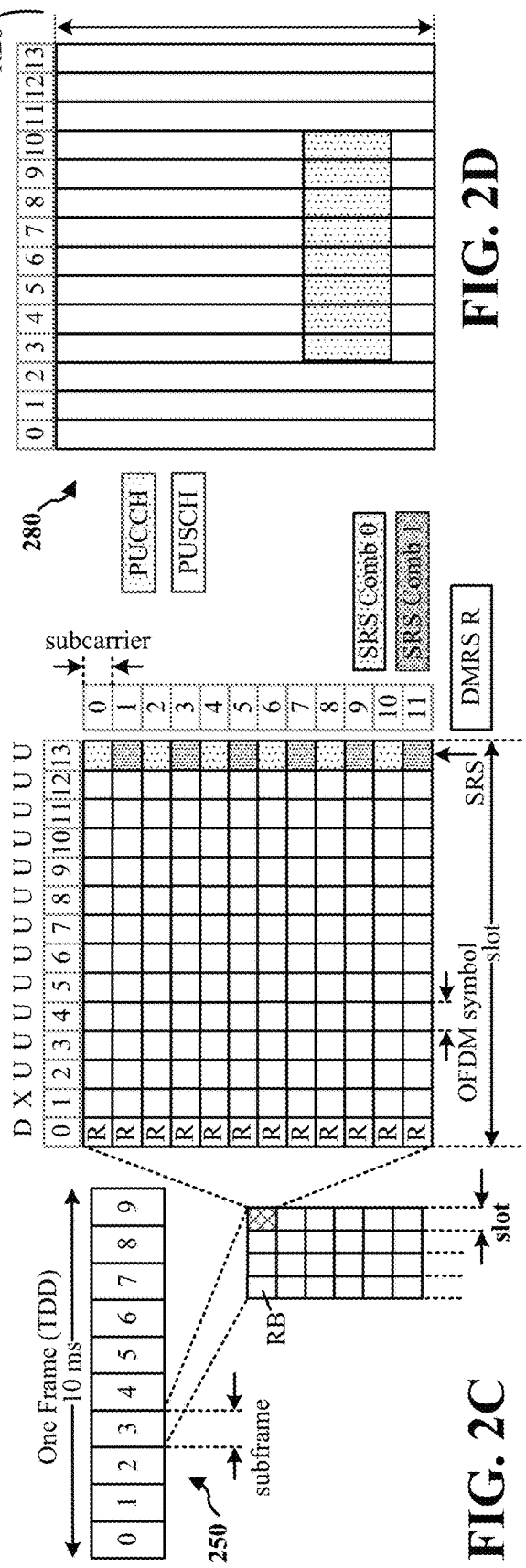

USER EQUIPMENT SPECIFIC DISCONTINUOUS RECEPTION CYCLE

CROSS REFERENCE TO RELATED APPLICATION(S)

This application claims the benefit of U.S. Provisional Application Ser. No. 62/797,911 entitled "USER EQUIPMENT SPECIFIC DISCONTINUOUS RECEPTION CYCLE" and filed on Jan. 28, 2019, which is expressly incorporated by reference herein in its entirety.

BACKGROUND

Technical Field

The present disclosure relates generally to communication systems, and more particularly, to a wireless communication system for paging between a base station and a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a UE is in idle mode and a network or base station receives downlink data for that UE, the base station pages the UE according to a discontinuous reception (DRX) cycle of that UE. Such DRX cycles may be cell-specific or UE specific. However, certain UEs which support enhanced Machine Type Communications with Coverage Enhancement (CE) (e.g. "eMTC UEs", narrowband Internet of Things ("NB-IoT UEs"), "UEs in CE"), may receive a paging message repeatedly over multiple subframes in order to correctly decode the paging message during the UE's DRX cycle. A problem may occur for such UEs operating in a CE mode under certain UE specific DRX cycles. For example, for UEs operating with small UE specific DRX cycles (e.g. 32 subframes), the number of repetitions for successful Paging Occasion (PO) decoding may exceed the time configured between consecutive POs. As a result, a UE may have insufficient decoding time before the DRX cycle ends or the next PO begins, leading to potential data loss. Moreover, the network cannot prohibit such UEs from selecting certain UE specific DRX cycles, as such a prohibition may limit the ability of UEs operating in a non-CE mode, e.g., within normal cell coverage, from being able to benefit from smaller UE specific DRX cycles. For simplicity, UEs capable of operating in CE mode (e.g. "eMTC UEs", "NB-IoT UEs", "UEs in CE"), are referred to as eMTC UEs in this document.

The present disclosure provides for a wireless communication system that allows base stations and UEs to better determine which UE specific DRX cycle to apply. Aspects presented herein enable the UE and base station to apply certain UE specific DRX cycles for paging when the UE is operating in non-CE mode while restricting the use of certain UE specific DRX cycles for paging when the UE is operating in a CE mode. The present disclosure allows the base station and UE to apply a UE specific DRX cycle for paging, from one set of DRX cycles, when the UE is operating in non-CE mode, while also allowing the base station and UE to apply another UE specific DRX cycle for paging, from a different set of DRX cycles, when the UE is operating in a CE mode (e.g. CE Mode A or B). In one aspect, when the UE is operating in non-CE mode, the UE and base station may select a UE specific DRX cycle for paging from a first set of UE specific DRX cycles (e.g. 32, 64, 128, and 256 subframes). In another aspect, if the UE supports and is operating in a first CE mode (e.g. CE Mode A), the UE and base station may select a UE specific DRX cycle for paging from a second set of UE specific DRX cycles (e.g. 128 and 256 subframes) used for CE Mode A. In a further aspect, if the UE supports and is operating in a second CE mode (e.g. CE Mode B), the UE and base station may select a UE specific DRX cycle for paging from a third set of UE specific DRX cycles (e.g. 256 subframes) used for CE Mode B. The UE may monitor for the base station's transmission of the paging message, including repetitions of the paging message if the UE is operating in either the first or second CE mode, based on the UE specific DRX cycle selected by the UE.

In an aspect of the disclosure, a method, a computer-readable medium, and an apparatus are provided. The apparatus is configured to select a UE specific DRX cycle from among a first set of UE specific DRX cycles if the UE is operating in a non-CE mode and to select the UE specific DRX cycle from among a second set of UE specific DRX cycles if the UE is operating in a first CE mode. The second set of UE specific DRX cycles is different than the first set of UE specific DRX cycles. Then, the apparatus monitors for a paging message based on the UE specific DRX cycle selected by the UE.

In another aspect of the disclosure, a method, a computer-readable medium, and an apparatus are provided. The apparatus is configured to select a UE specific DRX cycle from among a first set of UE specific DRX cycles if a UE is to be paged in a non-CE mode. The apparatus selects the UE specific DRX cycle from among a second set of UE specific DRX cycles if the UE is to be paged in a CE mode and the UE supports first CE mode, where the second set of UE specific DRX cycles is different than the first set of UE specific DRX cycles. Then, the apparatus transmits the paging message to the UE based on the UE specific DRX cycle selected by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
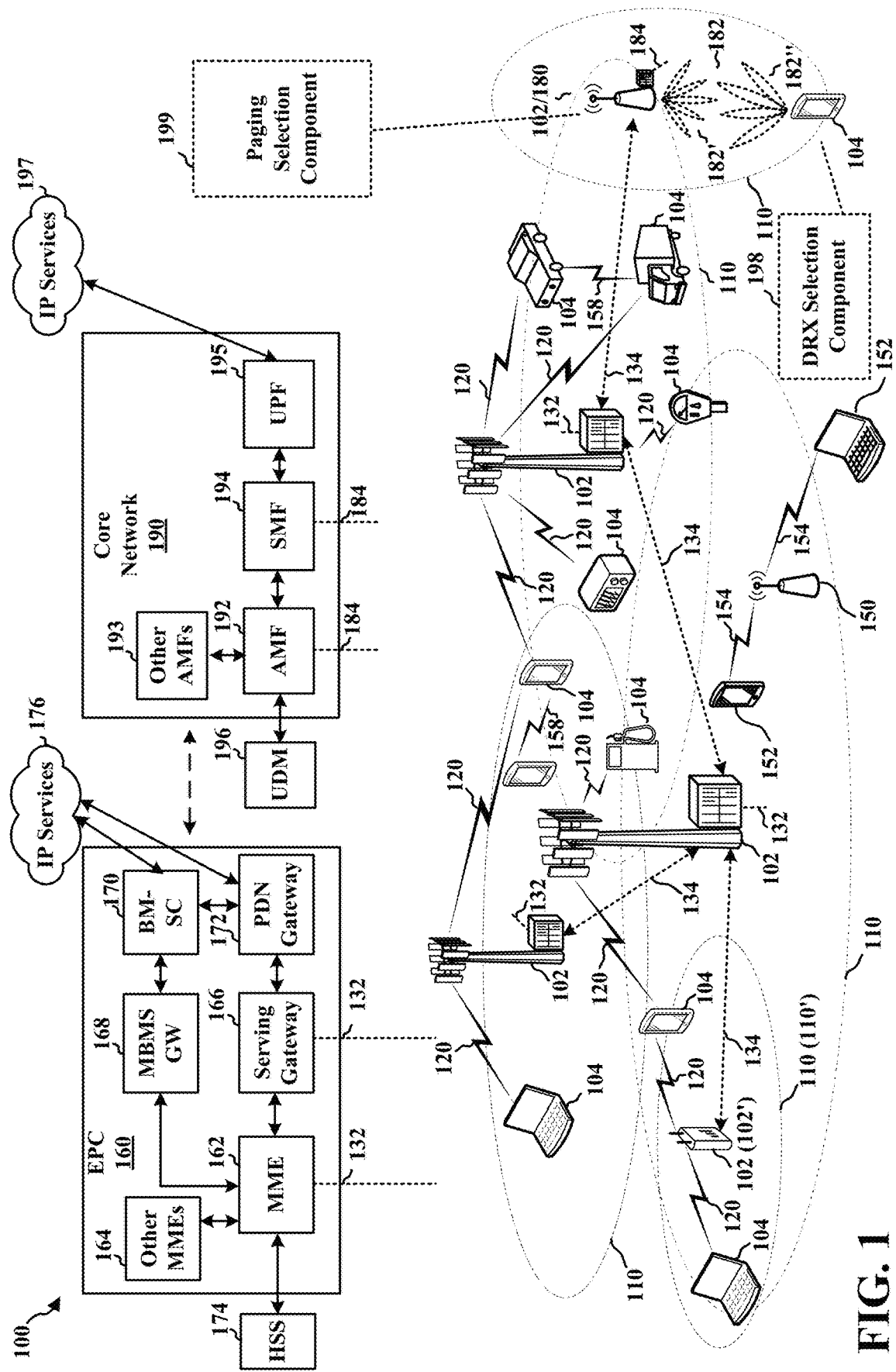
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a DRX selection component 198 configured to select a UE specific DRX cycle from among a first set of UE specific DRX cycles if the UE is operating in a non-CE mode; and to select the UE specific DRX cycle from among a second set of UE specific DRX cycles if the UE is operating in a first CE mode. In other aspects, the base station 180 may include a paging selection component 199 configured to select a UE-specific DRX cycle from among a first set of UE specific DRX cycles if a UE is to be paged in a non-CE mode; and to select the UE specific DRX cycle from among a second set of UE specific DRX cycles if the UE is to be paged in a CE mode and the UE supports the first CE mode. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
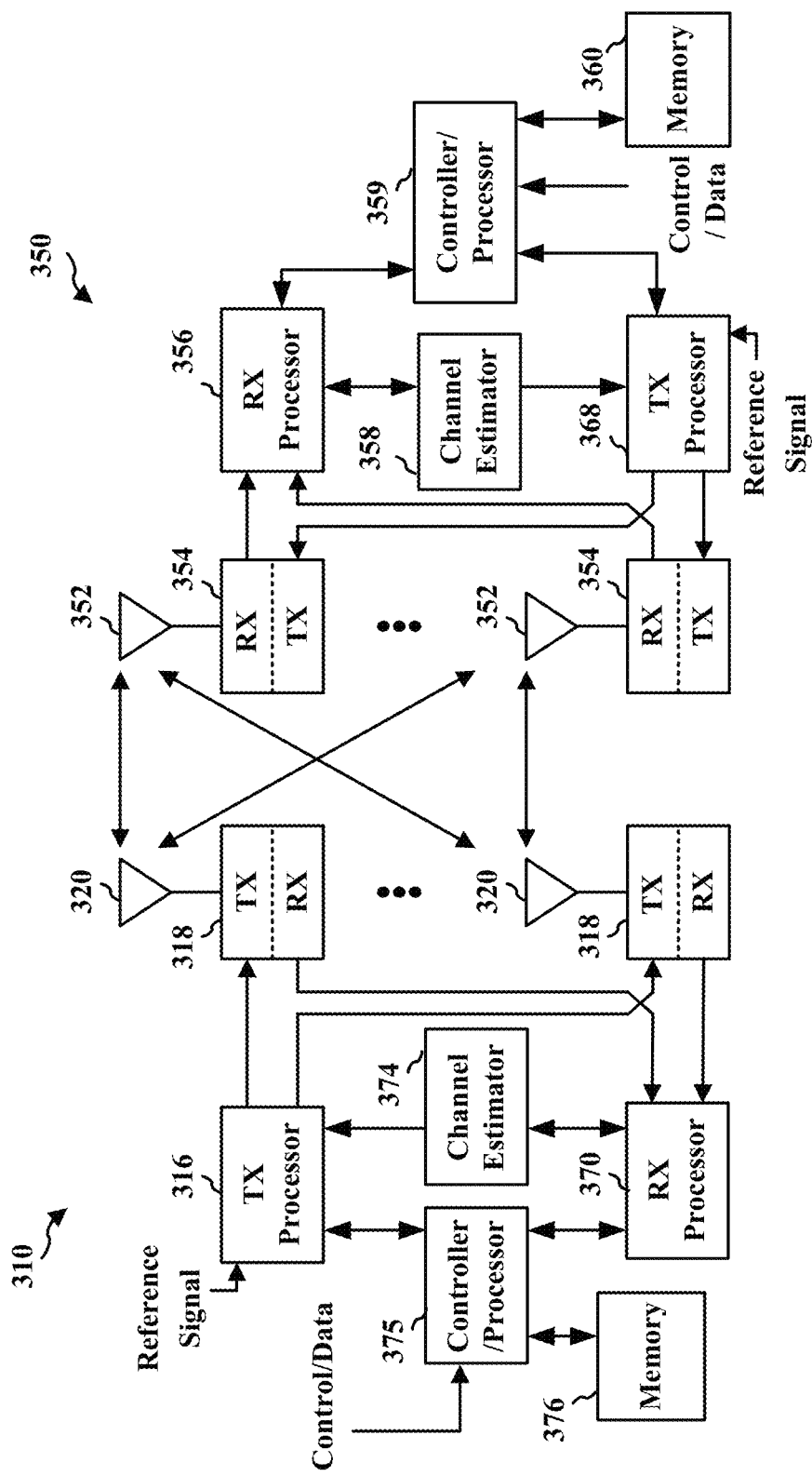
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with DRX selection component 198 of FIG. 1.

At least one of the TX processor 316, the RX processor 370, and the controller/processor 375 may be configured to perform aspects in connection with paging selection component 199 of FIG. 1.

When a UE is in idle mode and a network or base station receives downlink data for that UE, the base station may page the UE according to a DRX cycle. The network may configure paging messages (e.g. POs) to occur according to a DRX cycle that is based on a cell-specific DRX cycle or that is based on a UE specific DRX cycle. For cell-specific DRX cycles, the base station selects a default DRX cycle that UEs in the cell may use to monitor for paging and broadcasts information regarding that DRX cycle to the UEs (e.g. in SIB2). For UE specific DRX cycles, the UE reports the DRX cycle it will use to the core network (e.g. the MME), which in turn provides information about the UE specific DRX cycle to the base station. The base station then applies this UE specific DRX cycle for use in paging that particular UE. In DRX, the UE monitors for communication from the base station at periodic POs and sleeps when not expecting paging, e.g., between POs. The POs may be spaced in time according to the specified DRX cycle. Once the UE receives a paging message transmitted by the base station, the UE may decode the paging message and subsequently acquire the data addressed to that UE.

Figure 4:
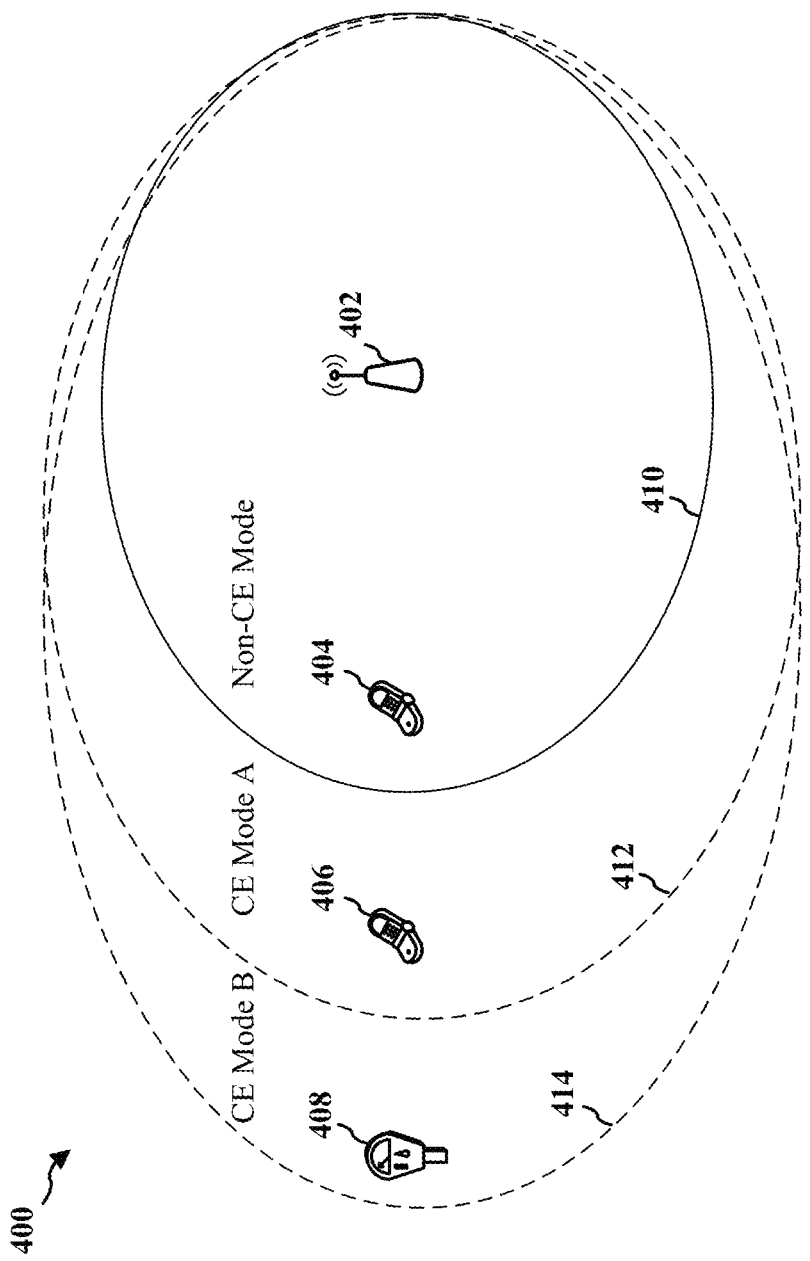
FIG. 4 is a diagram illustrating a base station in communication with multiple eMTC UEs.

Some UEs, which may be referred to as eMTC UEs, may support eMTC with CE. For example, FIG. 4 illustrates a diagram 400 of a base station 402 communicating with eMTC UEs 404, 406, 408. When a UE supporting eMTC is within the normal cell coverage 410 of the base station, the UE may operate under relatively good channel conditions without CE. UE 404 is an example of a UE operating in non-CE mode. However, if the UE moves outside the normal cell coverage of the base station, the UE may be configured to receive extended cell coverage under CE to compensate for poorer channel conditions. The base station may configure the extent of this cell coverage depending on the CE mode (e.g. CE Mode A or CE Mode B) supported by the UE. Thus, eMTC UE 406 is an example of a UE supporting CE Mode A and operating within extended cell coverage 412 for CE Mode A, while eMTC UE 408 is an example of a UE supporting both CE Mode A and B and operating within extended cell coverage 414 for CE Mode B. While some of these UEs may be mobile and switch between non-CE mode and a CE mode as they move farther from or closer to the base station, other UEs may operate in a CE mode (e.g. a stationary meter located deep in a basement, for example, UE 408). Additionally, for UEs supporting both CE modes, the base station may configure these UEs to switch between CE Mode A and B depending on the CE level reported by the UE.

Figure 5A:
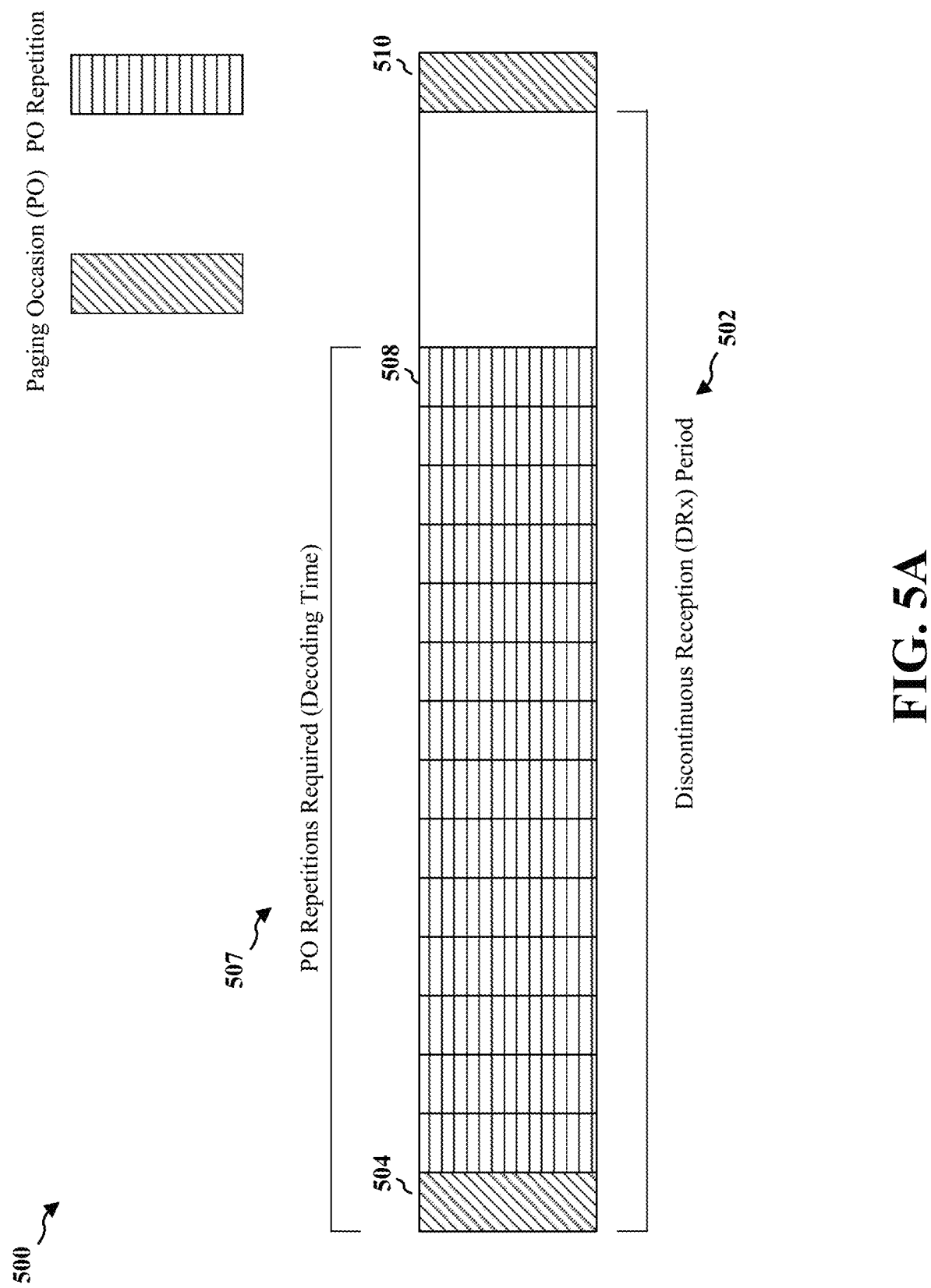
FIG. 5A is a diagram illustrating an example of normal paging operation with repetitions during a UE's DRX period.

An eMTC UE operating in non-CE mode may receive a paging message without repetition. An eMTC UE (hereinafter referred to as simply a UE) operating in a CE mode may receive a paging message (e.g. through MPDCCH) repeatedly over multiple subframes in order to correctly decode the PO during its DRX cycle. The UE may accumulate the repetitions in order to decode the paging message. FIG. 5A illustrates an example diagram 500 of network paging operating normally during a UE's DRX cycle. The base station may configure paging to occur based on a selected DRX cycle 502 (e.g. a cell-specific or UE specific DRX cycle) such that after the base station transmits PO 504, the UE has sufficient time, based on the PO repetitions for decoding or a decoding time 507, to receive and decode the transmitted repetitions 508 of PO 504 before the base station transmits the next PO 510. For example, where DRX cycle 502 is a cell-specific DRX cycle, the base station may select a large DRX cycle (e.g. 256 subframes) for UEs to apply when monitoring for paging transmissions in order to increase the likelihood of successful decoding of all repetitions 508 of PO 504 by the UE. Similarly, where DRX cycle 502 is a UE specific DRX cycle, the UE may select a large DRX cycle (e.g. 256 subframes) for the base station to apply when sending paging transmissions in order to increase the likelihood of successful decoding of the repetitions.

In eMTC, the UE may select a DRX cycle from the following set of predefined values: 32 subframes, 64 subframes, 128 subframes, and 256 subframes. Thus, the UE may select and report to the MME a UE specific DRX cycle of 32, 64, 128, or 256 subframes for the base station to apply when sending POs to the UE. The base station will then use the UE specific cycle when transmitting the PO and its repetitions. However, a problem may occur for UE specific DRX cycles when a UE operating in a CE mode selects a smaller UE specific DRX cycle than 128 or 256 subframes. For example, if the UE is positioned such that it uses, for example, more than 64 subframes or more than 128 subframes of repetitions for successful decoding of the PO, a shorter UE specific DRX cycle of only 32 subframes or 64 subframes may not allow for sufficient PO decoding time. Repetitions may only be accumulated between POs. Thus, there will not be enough subframes between the POs of these shorter DRX cycles to transmit the number of repetitions needed by the UE because the number of repetitions may exceed the time configured between consecutive POs.

Figure 5B:
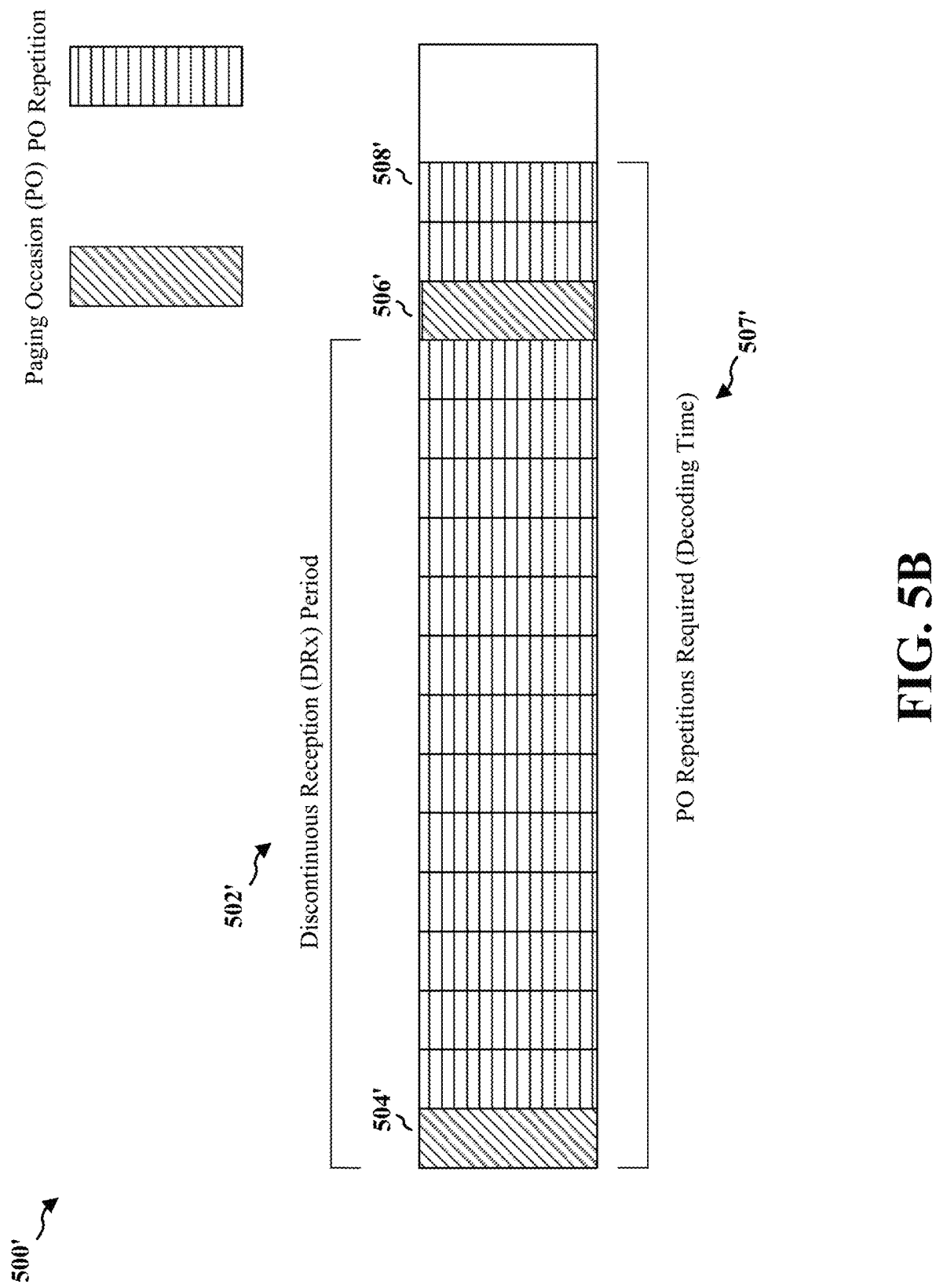
FIG. 5B is a diagram illustrating an example of abnormal paging operation with repetitions during a UE's DRX period.

An example diagram 500' of this abnormal paging operation can be seen in FIG. 5B. In one aspect, the UE may report 32 subframes as its UE specific DRX cycle 502', and therefore the base station configures its POs 504', 506' to be transmitted according this 32 subframe DRX cycle. However, if the UE uses more than 32 repetitions of PO 504' (e.g. until last repetition 508'), based on decoding time 507', to successfully decode the PO 504' (e.g. due to poor channel conditions), the UE may be unable to read PO 504' before its DRX cycle 502' ends or the next PO 506' begins, resulting in loss of data. Moreover, as both POs may have independent information, the UE cannot resolve this problem by accumulating repetitions of a different PO 504' to assist with decoding the current PO 506'.

In an attempt to resolve this problem, the UE may determine to stop using its UE specific DRX cycle. For example, the UE may decide to select the cell-specific DRX cycle, which the network can configure to avoid PO overlap. However, the UE would notify the network of this change (e.g. through a registration update), resulting in increased UE power consumption and increased signaling load especially if the UE travels between cells. The network cannot autonomously change a UE specific DRX cycle through cell configuration. Alternatively, the UE may determine to autonomously adjust its UE specific DRX cycle length to a larger value when it experiences poor channel conditions in order to increase the likelihood of successfully decoding the PO. However, unless the UE signals this adjustment to the base station (which itself is undesirable as it may increase power consumption and signaling load as described above), a lack of DRX synchronization between the UE and base station may result, leading to additional data loss. If the network prohibited the UE from selecting certain UE specific DRX cycles (e.g. 32, 64, or 128 subframes), such a prohibition would prevent UEs operating in non-CE mode (e.g., in normal cell coverage) from being able to benefit from the smaller UE specific DRX cycles. This would prevent the UE from achieving the better performance and reduced latency in wireless communications that a shorter UE specific DRX cycle may provide in certain situations.

The present disclosure provides for a wireless communication system that allows base stations and UEs to apply certain UE specific DRX cycles for paging when the UE is operating in non-CE mode while restricting the use of certain UE specific DRX cycles for paging when the UE is operating in a CE mode.

The present disclosure allows the base station and UE to select and apply a UE specific DRX cycle, for paging, from among one set of DRX cycles when the UE is operating in non-CE mode, while also allowing the base station and UE to apply another UE specific DRX cycle from a different set of DRX cycles when the UE is operating in a CE mode (e.g. CE Mode A or B). In one aspect, when the UE is operating in non-CE mode, the UE and base station may select a UE specific DRX cycle for paging from a first set of UE specific DRX cycles (e.g. 32, 64, 128, and 256 subframes). If the UE supports and is operating in a CE mode, the UE and base station may select a UE specific DRX cycle from a second set of UE specific DRX cycles. The second set may restrict the options of cycles by at least one of the UE specific DRX cycles. Thus, the set 32, 64, 128, and 256 might be restricted to 64, 128, and 256 for a CE mode. In another example, the set might be restricted to 128 and 256 for a CE mode. In yet another example, the set might be restricted to only 256 for a CE mode. In another aspect different sets of UE specific DRX cycles may be used for different CE modes. For example, if the UE supports and is operating in a first CE mode (e.g. CE Mode A), the UE and base station may select a UE specific DRX cycle for paging from the second set of UE specific DRX cycles (e.g. 128 and 256 subframes) used for CE Mode A. In a further aspect, if the UE supports and is operating in a second CE mode (e.g. CE Mode B), the UE and base station may select a UE specific DRX cycle for paging from a third set of UE specific DRX cycles (e.g. 256 subframes) used for CE Mode B. Thus, the selection may be from increasingly restricted sets of UE specific DRX cycles. The UE may monitor for the base station's transmission of the paging message, including repetitions of the paging message using a UE specific DRX cycle based on whether the UE is operating in either the first or second CE mode.

Thus, the UE may apply shorter UE specific DRX cycles (e.g. 32, 64, or 128 subframes) when operating in non-CE mode, where paging repetitions may not be necessary, while restricting the use of these UE specific DRX cycles in CE mode, where paging repetitions may be used. As well, the use of the different sets of UE specific DRX cycles for non-CE mode and CE mode (as well as for CE mode A and CE mode B) enables the base station and the UE to switch to different UE specific DRX cycles without requiring the UE to signal the switch, or send a new report, to the base station. For example, when the UE reports to the MME a UE specific DRX cycle of 32 or 64 subframes, the UE may use the reported DRX cycle to receive pages from the network when in non-CE mode, and if the UE changes to a CE mode, the UE may switch to applying a DRX cycle of 256 subframes (or 128 subframes in some configurations) to monitor for paging. This switch to the longer UE specific DRX cycle may be performed regardless of the DRX cycle that the UE previously reported. Similarly, in this example, the base station may page a UE in non-CE mode using the reported UE specific DRX cycle (e.g. 32, 64, or 128 subframes), and may page the UE operating in CE mode using larger UE specific DRX cycles (e.g. 256 subframes) regardless of the reported UE specific DRX cycle.

In another aspect, if the UE is one which operates in CE mode, the UE may report a UE specific DRX cycle of 256 subframes. In a further aspect, if the UE does not report any UE specific DRX cycle, the UE may use the cell-configured DRX cycle. In yet another aspect, if the UE is operating in non-CE mode and switches to a CE mode, the UE may switch to a cell-specific DRX cycle rather than switching to a larger UE specific DRX cycle. In an additional aspect, the base station may broadcast the possible values in the set of DRX cycles the UE may use when operating in CE Mode A and B. For example, the base station may indicate to a UE in CE mode that the UE may apply DRX cycles of 128 or 256 subframes if operating under CE Mode A, and DRX cycles of 256 subframes if operating under CE Mode B.

Accordingly, the present disclosure allows UEs to report and apply certain UE specific DRX cycles under non-CE mode, while also allowing these UEs to change their DRX cycle to one from a more restricted set of cycles when operating in CE mode. Similarly, the present disclosure allows the base station to receive the reported UE specific DRX cycle and apply that cycle for paging non-CE mode UEs, while applying a different DRX cycle from a more restricted set of cycles for paging CE-mode UEs. As no additional signaling (e.g. registration updates) is exchanged between the UE and the base station for changing the UE specific DRX cycle, the present disclosure saves UE power consumption and signaling load. Moreover, as the base station and UE apply the same DRX cycle, the base station and UE continue to remain synchronized. Consequently, the likelihood of abnormal paging operation as illustrated in FIG. 5B may be reduced.

Figure 6A:
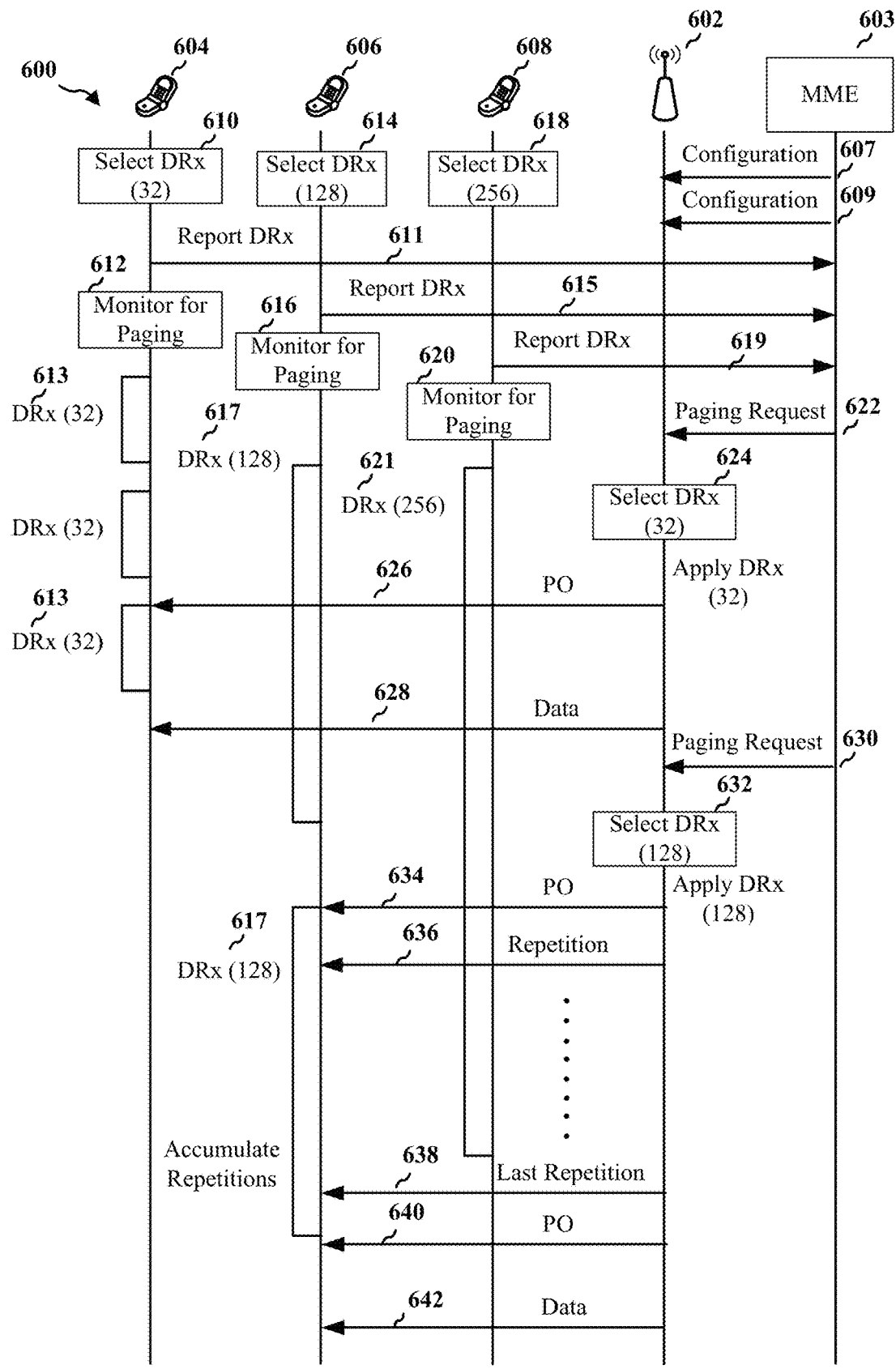
FIGS. 6A and 6B are a call flow diagram between a base station and multiple eMTC UEs.
Figure 6B:
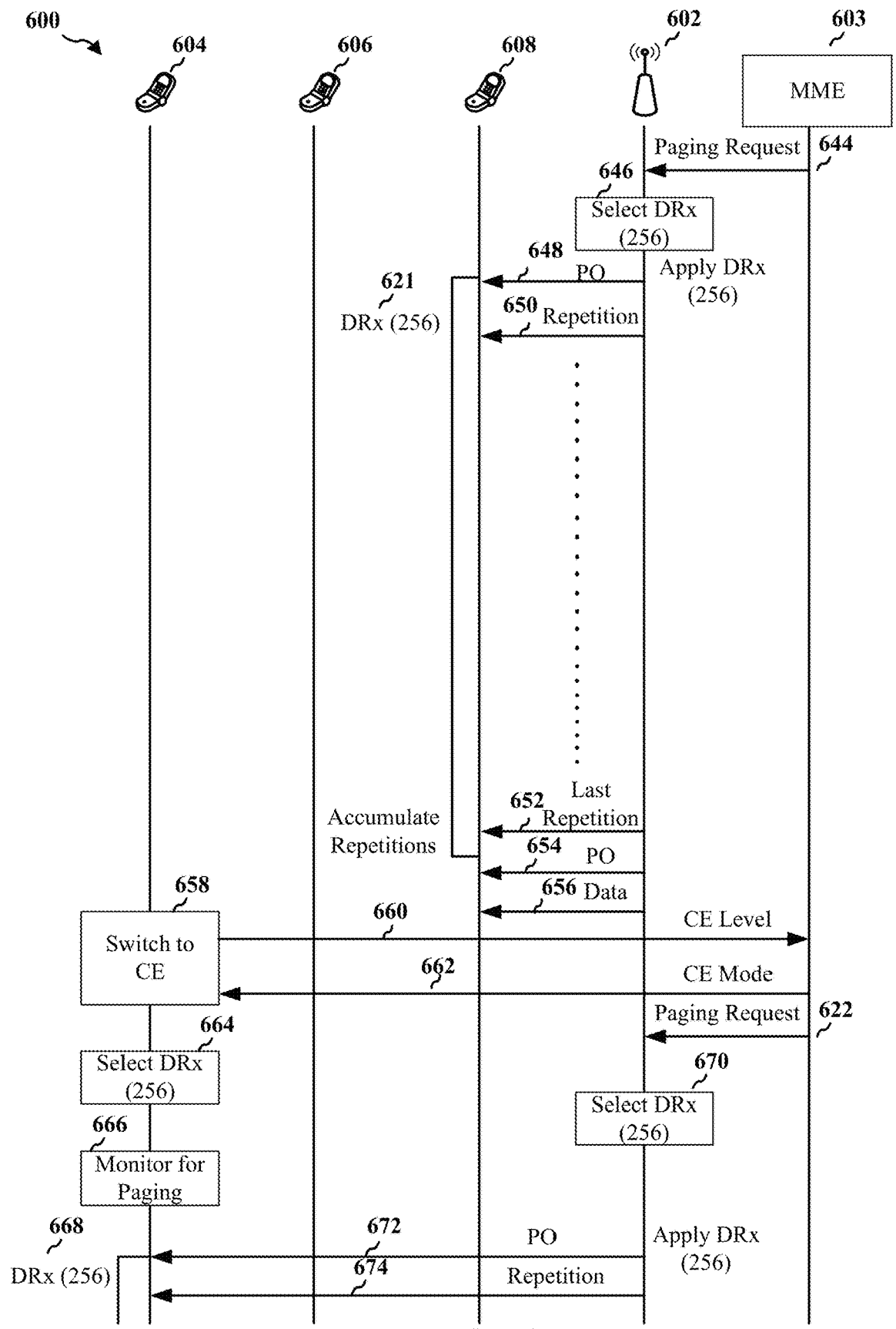

FIGS. 6A and 6B are a call flow diagram 600 illustrating an example paging procedure between a base station 602 in communication with a MME 603 and multiple eMTC UEs 604, 606, 608 over a transmission medium. In this example, UE 604 is a UE supporting CE Modes A and B and operating currently in non-CE mode (e.g. UE 404), UE 606 is a UE supporting only CE Mode A and operating currently in CE Mode A (e.g. UE 406), and UE 608 is a UE supporting CE Modes A and B and operating currently in CE Mode B (e.g. UE 408). Although the example of FIGS. 6A and 6B illustrate and describe communication to and from an MME (e.g. in LTE), the communication may alternatively be to and from an AMF or other network component (e.g. in 5G).

Referring to FIG. 6A, all three UEs 604, 606, 608 select a UE specific DRX cycle for paging. UE 604 is operating in non-CE mode and may select a DRX cycle from among a first set of UE specific DRX cycles. The first set may include, for example, UE specific DRX cycles of 32, 64, 128, and 256 subframes, although other combinations are possible (e.g. the first set may include 64, 128, and 256 subframes). In this example, UE 604 selects (610) a UE specific DRX cycle of 32 subframes from the set and reports (611) this UE specific DRX cycle to the MME 603. For instance, if the first set is [32, 64, 128, 256], with each DRX cycle having a corresponding set index from 0-3, the UE may report the DRX cycle corresponding to index 0 in the first set to the MME. The UE 604 subsequently monitors (612) the transmission medium for a paging message from the base station periodically according to its selected UE specific DRX cycle (613), applying a UE specific DRX of 32 subframes.

UE 606 is operating in CE mode A and therefore selects a UE specific DRX cycle from among a second set of UE specific DRX cycles used for paging under CE Mode A. The second set may be predefined (e.g. in the memory of the UE), or may be broadcast by the base station 602. The base station 602 may be configured with the second set based on a configuration 607 received from the MME 603. The second set is different than the first set. For example, if the first set has three possible UE specific DRX cycles (e.g. 64, 128, and 256), the second set may include two UE specific possible DRX cycles (e.g. 128 and 256 subframes). In another example, if the first set has four possible UE specific DRX cycles (e.g. 32, 64, 128, and 256), the second set may include three possible UE specific DRX cycles (e.g. 64, 128, and 256). Alternatively, the selection and reporting may be restricted to 256 subframes. In this example, UE 606 selects (614) a UE specific DRX cycle of 128 subframes from the set and reports (615) this UE specific DRX cycle to the MME 603. As another example, the second set may comprise the same number or more UE specific DRX cycles as the first set, but the UE specific DRX cycles may be different than the first set. For instance, the second set may comprise [128, 128, 128, 256]. An index may be used to reference each DRX cycle from within a corresponding set to the MME, e.g., using an index from 0-3. In the example in which the second set may comprise fewer UE specific DRX cycles than the first set (e.g. [64, 128, 256] or [128, 256]), the UE may report the DRX cycle corresponding to any of indices 0-2 (if one fewer) or any of indices 0-1 (if two fewer) in the second set. The UE 606 subsequently monitors (616) the transmission medium for a paging message from the base station periodically according to its selected UE specific DRX cycle (617), applying a UE specific DRX of 128 subframes. As UE 606 is operating in a CE mode, the UE further monitors for repetitions of the paging message.

UE 608 is operating in CE mode B and therefore selects a UE specific DRX cycle from among a third set of UE specific DRX cycles used for paging under CE Mode B. The third set may be predefined (e.g. in the memory of the UE), or may be broadcast by the base station 602. The base station 602 may be configured with the third set based on a configuration 609 received from the MME 603. The third set is different than the second set. For example, if the second set has two possible UE specific DRX cycles (e.g. 128 and 256), the third set may include one possible UE specific DRX cycle (e.g. 256 subframes). In another example, if the second set has three possible UE specific DRX cycles (e.g. 64, 128, and 256), the third set may include two possible UE specific DRX cycles (e.g. 128 and 256). Alternatively, the selection may be restricted to 256 subframes. In this example, UE 608 selects (618) a UE specific DRX cycle of 256 subframes and reports (619) this UE specific DRX cycle to the MME 603. As another example, the third set may comprise [256, 256, 256, 256], with each DRX cycle having a corresponding set index from 0-3. The UE may report the DRX cycle corresponding to any of indices 0-3 in the third set to the MME. The UE 608 subsequently monitors (620) the transmission medium for a paging message from the base station periodically according to its selected UE specific DRX cycle (621), applying a UE specific DRX of 256 subframes. As UE 608 is operating in a CE mode, the UE further monitors for repetitions of the paging message.

When the network receives downlink (DL) data for the UEs, the MME may send a paging request to the base station. The paging request may include the UE specific DRX cycles reported by the UEs. In this example, MME 603 sends a paging request 622 to the base station 602 for paging UE 604, including UE 604's reported UE specific DRX cycle 613. In this example, the base station knows that UE 604 is operating in non-CE mode (e.g. as identified from a prior Attach Request or Tracking Area Update request). Consequently, the base station selects (624) the UE's reported DRX cycle of 32 subframes for paging the UE, which was in the first set of subframes (e.g. 32, 64, 128, and 256) selected by the UE. The base station subsequently transmits a paging message (e.g. PO 626) to UE 604 according to the selected DRX cycle.

As a result, UE 604's DRX cycle 613 and base station 602's transmission of PO 626 are synchronized. Therefore, UE 604 monitors for transmissions and receives PO 626 during the on period of its DRX cycle. As UE 604 is operating in non-CE mode, no repetitions of the PO may be necessary. Consequently, UE 604 may successfully decode the PO. Once the paging process is complete, UE may subsequently receive data 628.

Subsequently, MME 603 may send a paging request 630 to the base station 602 for paging UE 606, including UE 606's reported UE specific DRX cycle 617. In this example, the base station knows that UE 606 is operating in CE Mode A (e.g. as identified from a prior Attach Request or Tracking Area Update request) as UE 606 only supports CE Mode A. Consequently, the base station determines whether the UE's reported DRX cycle is in the second set of allowed UE specific DRX cycles (e.g. 128 and 256 subframes) used for paging under CE Mode A. If the reported DRX cycle is in the second set, the base station may select the reported DRX cycle for use in paging. In contrast, if the DRX cycle is not in the second set, the base station selects a minimum value in the second set. Here, as the UE's reported DRX cycle of 128 subframes falls within the second set (e.g. 128 and 256), the base station selects (632) the UE's reported DRX cycle of 128 subframes for paging the UE. The base station subsequently transmits a paging message (e.g. PO 634) to UE 606 according to the selected DRX cycle. Moreover, as the base station knows that the UE is in a CE mode, the base station transmits repetitions 636 of PO 634 to increase the likelihood that UE 606 will successfully decode the paging message prior to the base station transmitting the next PO 640. These repetitions 636 are spaced in time between POs 634 and 640 to accommodate the selected DRX cycle of 128 subframes.

As a result, UE 606's DRX cycle 617 and base station 602's transmission of PO 634 and its repetitions 636 are synchronized. Therefore, UE 606 monitors for transmissions and receives PO 634 during the on period of its DRX cycle. As UE 606 is operating in CE mode, UE 606 also receives and accumulates the repetitions 636 of PO 634 during its DRX cycle up until the last repetition 638 before PO 640, allowing the UE to successfully decode the PO 634. Once the paging process is complete, UE may subsequently receive data 642.

Referring to FIG. 6B, MME 603 may send a paging request 644 to the base station 602 for paging UE 608, including UE 608's reported UE specific DRX cycle 621. In this example, the base station knows that UE 608 is operating in a CE Mode (e.g. as identified from a prior Attach Request or Tracking Area Update request). However, as UE 608 supports both CE Mode A and B, the base station may or may not know at this particular point whether UE 608 is in CE Mode A or B. For example, UE 608 may have switched from CE Mode A to CE Mode B without notifying the base station (e.g. UE 608 may have moved farther from the base station in idle mode). Consequently, regardless of the CE mode under which UE 608 is currently operating, the base station determines whether the UE's reported DRX cycle is in the third set of allowed UE specific DRX cycles (e.g. 256 subframes) used for paging under CE Mode B. If the reported DRX cycle is in the third set, the base station may select the reported DRX cycle for use in paging. In contrast, if the DRX cycle is not in the third set, the base station selects a minimum value in the third set. Here, as the UE's reported DRX cycle of 256 subframes falls within the third set (e.g. 256), the base station selects (646) the UE's reported DRX cycle of 256 subframes for paging the UE. The base station subsequently transmits a paging message (e.g. PO 648) to UE 608 according to the selected DRX cycle. Moreover, as the base station knows that the UE is in a CE mode, the base station transmits repetitions 650 of PO 648 to increase the likelihood that UE 608 will successfully decode the paging message prior to the base station transmitting the next PO 654. These repetitions 650 are spaced in time between POs 648 and 654 to accommodate the selected DRX cycle of 256 subframes.

As a result, UE 608's DRX cycle 621 and base station 602's transmission of PO 648 and its repetitions 650 are synchronized. Therefore, UE 608 monitors for transmissions and receives PO 648 during the on period of its DRX cycle. As UE 608 is operating in a CE mode, UE 608 also receives and accumulates the repetitions 650 of PO 648 during its DRX cycle up until the last repetition 652 before PO 654, allowing the UE to successfully decode the PO 648. Once the paging process is complete, UE may subsequently receive data 656.

In one aspect, one or more of the UEs may switch from non-CE mode to CE mode, or vice-versa. For example, a UE operating in non-CE mode may switch to CE mode when it moves farther from the base station and may switch back to non-CE mode when it moves closer to the base station. The base station knows when the UE has switched between non-CE mode and a CE mode. For instance, the UEs may report a CE level to the base station, and the base station may configure the UE's CE mode based on the CE level. Thus, FIG. 6B illustrates an example where UE 604 switches (658) to CE mode (e.g. UE 604 moves away from the base station outside of normal cell coverage). As indicated supra, UE 604 supports both CE Modes A and B in this example. Base station 602 is aware of this change; for instance, UE 604 may transmit its CE level 660 to the base station and the base station may transmit a message 662 in response configuring UE 604 as CE mode A or B depending on the CE level.

However, once a UE switches to CE mode, more paging repetitions may be used to compensate for the poorer channel conditions. Consequently, the UE restricts its DRX cycle to one from the second set or third set of UE specific DRX cycles used for CE mode, regardless of the UE's previously reported UE specific DRX cycle, in order to increase the likelihood of successfully decoding the paging message. For example, after UE 604 switches to a CE mode, UE 604 may select (664) a DRX cycle of 256 subframes (e.g. from the third set) notwithstanding its previous selection and reporting (611) of a DRX cycle of 32 subframes. As a result, the UE 604 stops monitoring (612) for transmissions based on the previously reported DRX cycle and instead monitors (666) for transmissions periodically according to the newly selected DRX cycle (668), applying a DRX of 256 subframes. As UE 604 is now operating in a CE mode, the UE further monitors for repetitions of the paging message.

Similarly, after a UE switches to CE mode, the base station uses the UE's restricted DRX cycle for paging, regardless of the DRX cycle the UE previously reported. For example, after UE 604 switches to a CE mode, the base station 602 may be select (670) a DRX cycle of 256 subframes (e.g. from the third set) for paging the UE notwithstanding the UE's previous selection and reporting. The base station subsequently transmits a paging message (e.g. PO 672) including repetitions 674 to UE 604 according to the selected DRX cycle. In this way, UE 604's DRX cycle 668 and base station 602's transmission of PO 672 and its repetitions 674 remain synchronized, allowing UE 604 to receive and successfully decode the PO 672.

Figure 7:
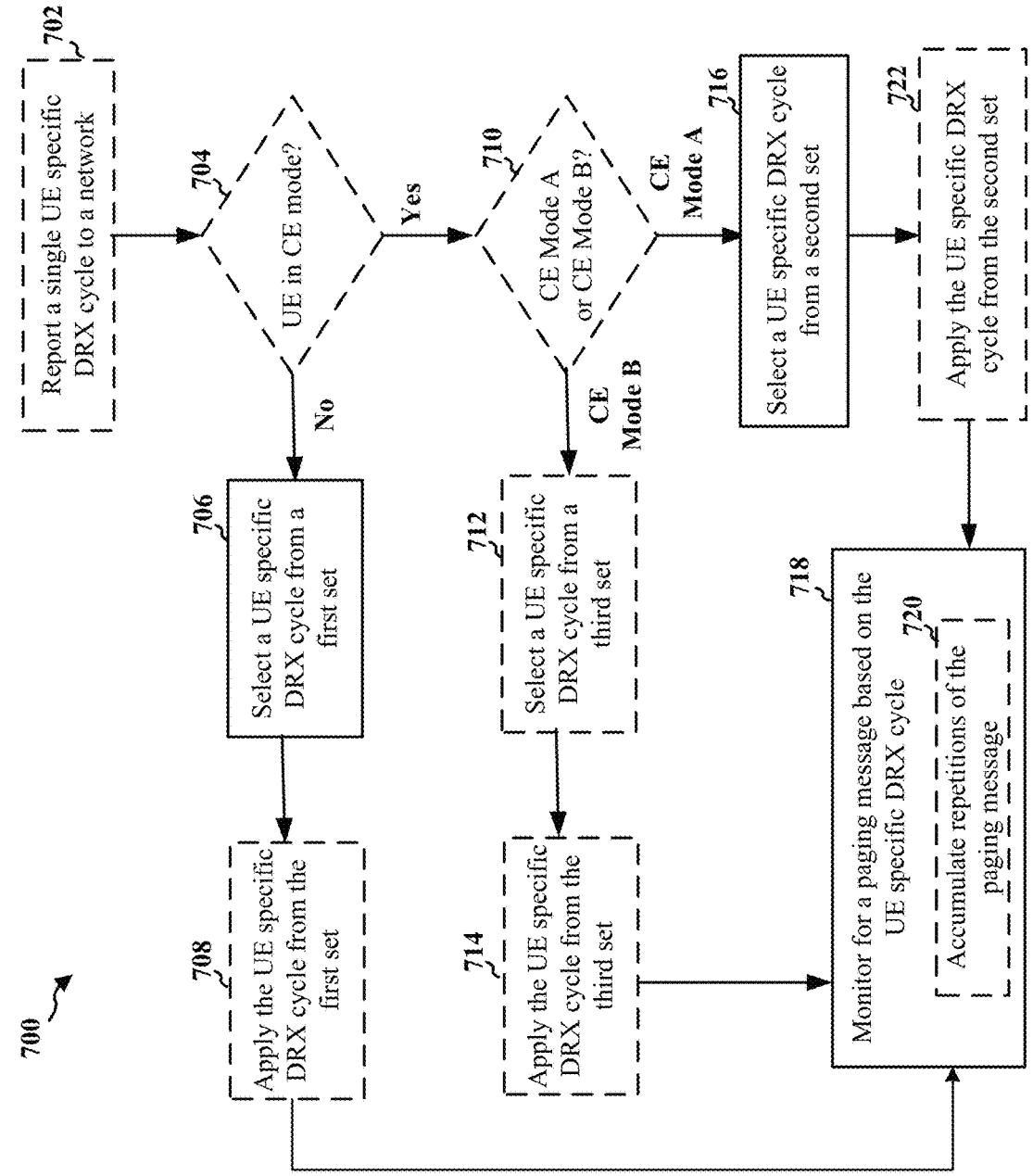
FIG. 7 is a flowchart of a method of wireless communication.

FIG. 7 is a flowchart 700 of a method of wireless communication. The method may be performed by a UE (e.g., UE 104, 350, 404, 406, 604, 606, 608, 1150, the apparatus 802, 802'; the processing system 914, which may include the memory 360 and which may be the entire UE 350 or a component of the UE 350, such as the TX processor 368, the RX processor 356, and/or the controller/processor 359). The UE may communicate with a base station, e.g., based on eMTC. Optional aspects of the method are illustrated with a dashed line. The method improves the ability of a UE to receive a paging message when using a UE specific DRX cycle when the UE may be operating in one of multiple modes, e.g., non-CE mode, CE mode A, or CE mode B.

A UE may determine, at 704, whether the UE is operating in a CE mode or a non-CE mode. FIG. 4 illustrates an example of UEs that are operating in non-CE mode, CE mode A, or CE mode B. For instance, referring to FIG. 6B, a UE operating in non-CE mode may switch to CE mode when it moves farther from the base station and may switch back to non-CE mode when it moves closer to the base station. Thus, the UE may determine that it is operating in a non-CE mode when the UE is closer to the base station (e.g. in normal cell coverage 410) or operating in a CE mode when the UE is farther from the base station (e.g. in extended cell coverages 412 or 414). The UE may use the determination to select between multiple sets of UE specific DRX cycles.

At 706, if the UE is operating in a non-CE mode, the UE selects a UE specific DRX cycle from among a first set of UE specific DRX cycles. For example, 706 may be performed by first UE specific DRX cycle component 808. The first set of UE specific DRX cycles may include cycles of 32 subframes, 64 subframes, 128 subframes, and 256 subframes. For example, the first set of UE specific DRX cycles may include [32, 64, 128, 256], [64, 128, 256], [32, 128, 256], [32, 32, 128, 256], etc. For example, FIG. 6A illustrates an example UE 604 in non-CE mode that may select a UE specific DRX cycle 613 of 32 subframes.

However, if the UE is operating in a CE mode, the UE instead selects a UE specific DRX cycle from among a second set of UE specific DRX cycles, at 716. For example, 716 may be performed by second UE specific DRX cycle component 810. The second set of UE specific DRX cycles is different than the first set of UE specific DRX cycles. In one aspect, the second set may comprise at least one UE specific DRX cycle less than the first set of UE specific DRX cycles. In one example, if the first set comprises four cycles [32, 64, 128, 256], the second set may comprise three cycles [64, 128, 256]. In another example, the second set may be restricted to 128 and 256 or only to 256. In another aspect, the second set may comprise at least one UE specific DRX cycle that is different than the first set of UE specific DRX cycles, where the second set has the same number of UE specific DRX cycles as the first set. For example, if the first set comprises four cycles [32, 64, 128, 256], the second set may comprise four cycles [128, 128, 128, 256]. Thus, in either aspect, the second set of UE specific DRX cycles may comprise a restricted or limited set from among the larger first set of UE specific DRX cycles. Thus, the second set of UE specific DRX cycles may comprise one or more UE specific DRX cycles from among the first set of UE specific DRX cycles. For example, the second set of UE specific DRX cycles may comprise at least a longest UE specific DRX cycle (e.g., 256 subframes) from among the first set of UE specific DRX cycles. In FIGS. 6A and 6B, UEs 606 and 608 are operating in a CE mode, and the selection of a UE specific DRX cycle (e.g. 617 and 621 respectively) is made from a more restrictive set of UE specific DRX cycles (e.g. 128 and 256 respectively) than for UE 604.

In addition to merely distinguish between a CE mode and a non-CE mode, the UE may further distinguish between types of CE modes. Thus, at 710, the UE may determine whether the UE is operating in a first CE mode, e.g., CE mode A, or a second CE mode, e.g., CE mode B. For example, referring to FIG. 6B, the UE may determine its CE mode based on a message 662 received from the base station configuring the UE as CE mode A or B depending on the UE's CE level 660 and/or based on the UE's position with respect to the base station (e.g. in extended cell coverages 412 or 414). The UE may also determine its CE mode based on the CE mode(s) which the UE supports (e.g. UE 606 only supports CE mode A). Thus, in FIGS. 6A and 6B, UE 606 is operating in CE mode A, whereas UE 608 is operating in CE mode B.

If the UE is determined to be operating in the first CE mode, e.g., CE mode A, the UE may select the UE specific DRX cycle from among the second set, as described in connection with 716. However, if the UE is determined to be operating in the second CE mode, e.g., CE mode B, the UE may select the UE specific DRX cycle from among a third set of UE specific DRX cycles, where the third set of UE specific DRX cycles is different than the second set of UE specific DRX cycles, at 712. For example, 712 may be performed by third UE specific DRX cycle component 812. In one aspect, the third set may comprise at least one UE specific DRX cycle less than the second set of UE specific DRX cycles, for example, if the second set comprises [128, 256], the third set may comprise [256]. In another aspect, the second set may comprise at least one UE specific DRX cycle different than the first set of UE specific DRX cycles, for example, if the second set comprises [128, 128, 128, 256], the third set comprises [256, 256, 256, 256]. Thus, the third set of UE specific DRX cycles may comprise a further restricted/limited set from among the second set of UE specific DRX cycles. The third set of UE specific DRX cycles may comprise one or more UE specific DRX cycles from among the second set of UE specific DRX cycles. For example, the third set of UE specific DRX cycles may comprise a longest UE specific DRX cycle from among the second set of UE specific DRX cycles. In FIG. 6A, UE 608 is operating in a CE mode B, and the selection of its UE specific DRX cycle (e.g. 621) is made from a more restrictive set of UE specific DRX cycles (e.g. 256) than for UE 606 (and UE 604).

As illustrated at 708, the UE may apply the UE specific DRX cycle from the first set of UE specific DRX cycles if the UE is operating in the non-CE mode. If the UE reported support for the first CE mode (e.g., CE mode A) and the UE is operating in the CE mode, the UE may apply the UE specific DRX cycle from the second set of UE specific DRX cycles, at 722. Likewise, if the UE reported support for the second CE mode (e.g., CE mode B) and the UE is operating in the CE mode, the UE may apply the UE specific DRX cycle from the third set of UE specific DRX cycles, at 714. For example, 708, 714, and 722 may each be performed by DRX component 814. The paging occasions that the UE uses to monitor for the paging message may be spaced from each other according to the UE specific DRX cycle selected by the UE. The UE specific DRX cycle will enable the UE to determine the spacing between paging occasions, and therefore, determine the repetitions that can be accumulated in order to decode the paging message. Thus, in FIG. 6A, UE 604 in non-CE mode applies UE specific DRX cycles 613 selected from the first set, UE 606 in CE mode A applies UE specific DRX cycles 617 selected from the second set, and UE 608 in CE mode B applies UE specific DRX cycles 621 selected from the third set. For example, the UEs may turn their receivers off and on according to their respective, selected DRX cycles as they monitor for POs 626, 634, 640 from the base station.

At 718, the UE monitors for a paging message based on the UE specific DRX cycle selected by the UE. For example, 718 may be performed by paging message component 816. If the UE is operating in a non-CE mode, the paging message will only be sent once. If the UE is operating in a CE mode, the paging message will include repetitions of the paging message. Thus, at 720, monitoring for repetitions of the paging message may comprise accumulating repetitions of the paging message between paging occasions. The paging occasions that the UE uses to monitor for the paging message may be spaced from each other according to the UE specific DRX cycle selected by the UE. The UE specific DRX cycle will enable the UE to determine the spacing between paging occasions, and therefore, determine the repetitions that can be accumulated in order to decode the paging message. Thus, in FIGS. 6A and 6B, the UEs 604, 606, 608 may respectively monitor for paging at 612, 616, and 620. The UE 604 may receive the PO 626 once (e.g. without repetitions) because it is operating in non-CE mode. However, the UEs 606, 608 in CE mode may respectively receive their POs 634, 648 with repetitions 636, 650 spaced from each other according to their respective DRX cycles 617, 621, and the UEs may accumulate the repetitions 636, 650 to successfully decode the respective paging messages.

As illustrated at 702, the UE may report a UE specific DRX cycle to a network. For example, 702 may be performed by report component 818. The information may be provided from the network to the base station, as described in connection with FIGS. 6A and 6B. A base station may use the reported UE specific DRX cycle to page the UE, depending on whether the UE is to be paged in a CE mode or a non-CE mode. For example, in FIG. 6A, UEs 604, 606, 608 may respectively report their DRX cycles at 611, 615, and 619 to the MME 603, which in turn provides this information to the base station 602 to send POs to the UEs as described above.

Figure 8:
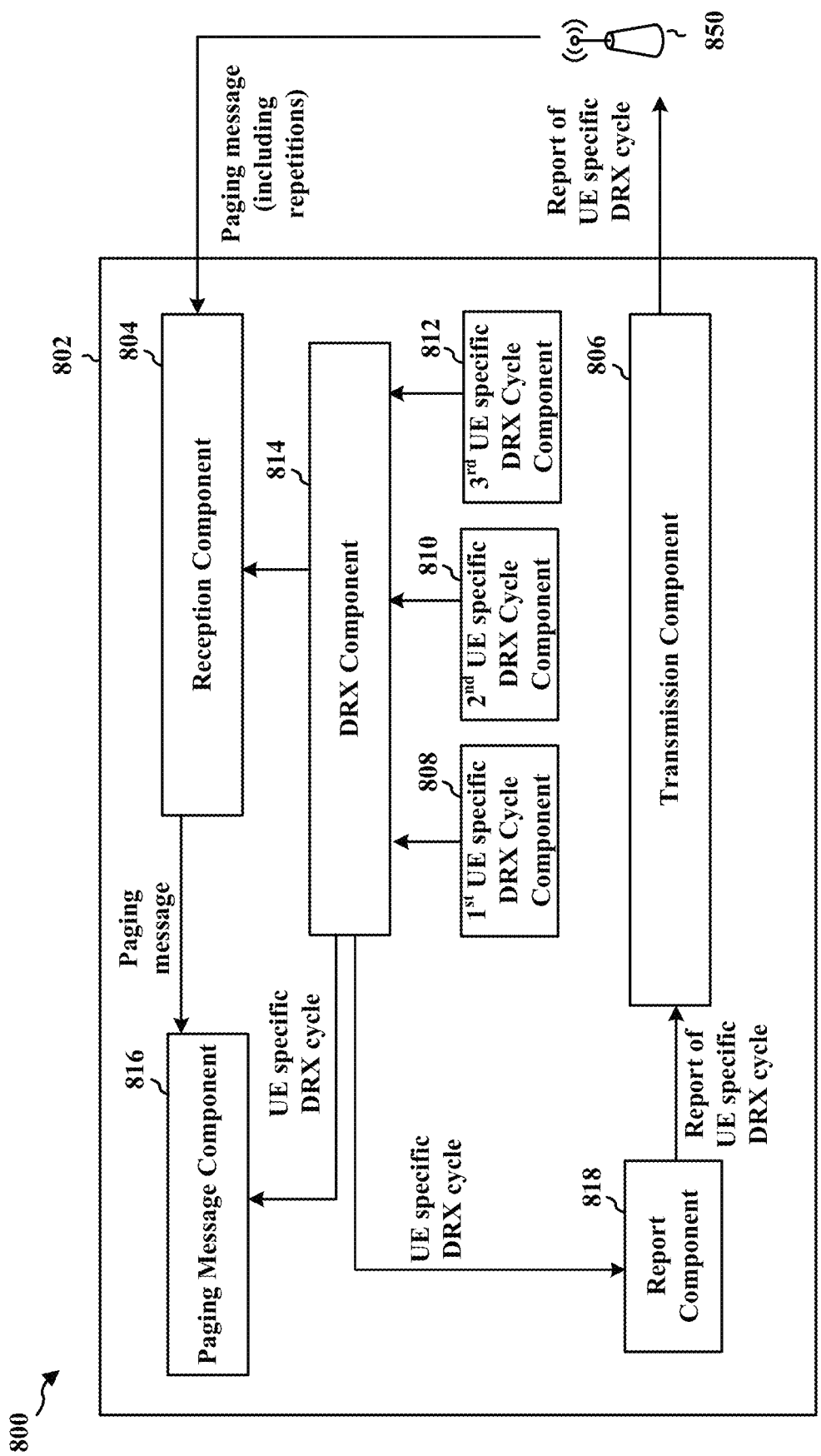
FIG. 8 is a conceptual data flow diagram illustrating the data flow between different means/components in an example apparatus.

FIG. 8 is a conceptual data flow diagram 800 illustrating the data flow between different means/components in an example apparatus 802. The apparatus may be a UE (e.g., UE 104, 350, 404, 406, 604, 606, 608, 1150). The apparatus includes a reception component 804 configured to receive downlink communication from base station 850, and a transmission component 806 configured to transmit uplink communication to the base station. The apparatus includes a first UE specific DRX cycle component 808 configured to select a UE specific DRX cycle from among a first set of UE specific DRX cycles if the UE is operating in a non-CE mode, e.g., as described in connection with 706. The apparatus includes a second UE specific DRX cycle component 810 configured to select the UE specific DRX cycle from among a second set of UE specific DRX cycles if the UE is operating in a first CE mode, wherein the second set of UE specific DRX cycles comprises at least one UE specific DRX cycle less than the first set of UE specific DRX cycles, e.g., as described in connection with 716. The apparatus may further include a third UE specific DRX cycle component 812 configured to select the UE specific DRX cycle from among a third set of UE specific DRX cycles if the UE is operating in a second CE mode, wherein the third set of UE specific DRX cycles comprises at least one UE specific DRX cycle less than the second set of UE specific DRX cycles, e.g., as described in connection with 712. The apparatus may comprise an DRX component 814 that is configured to apply the UE specific DRX cycle from the first set of UE specific DRX cycles if the UE is operating in the non-CE mode, apply the UE specific DRX cycle from the second set of UE specific DRX cycles if the UE reported support for the first CE mode and the UE is operating in the CE mode, and apply the UE specific DRX cycle from the third set of UE specific DRX cycles if the UE reported support for the second CE mode and the UE is operating in the CE mode, e.g., as described in connection with 708, 714, and 722. The UE may comprise a paging message component 816 configured to monitor for a paging message based on the UE specific DRX cycle selected by the UE, e.g., as described in connection with 718. The apparatus may comprise a report component 818 configured to report the selected UE specific DRX cycle, e.g., to report a single UE specific DRX cycle to a network, e.g., as described in connection with 702.

The apparatus may include additional components that perform each of the blocks of the algorithm in the aforementioned flowcharts of FIGS. 6A, 6B, and 7. As such, each block in the aforementioned flowcharts of FIGS. 6A, 6B, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
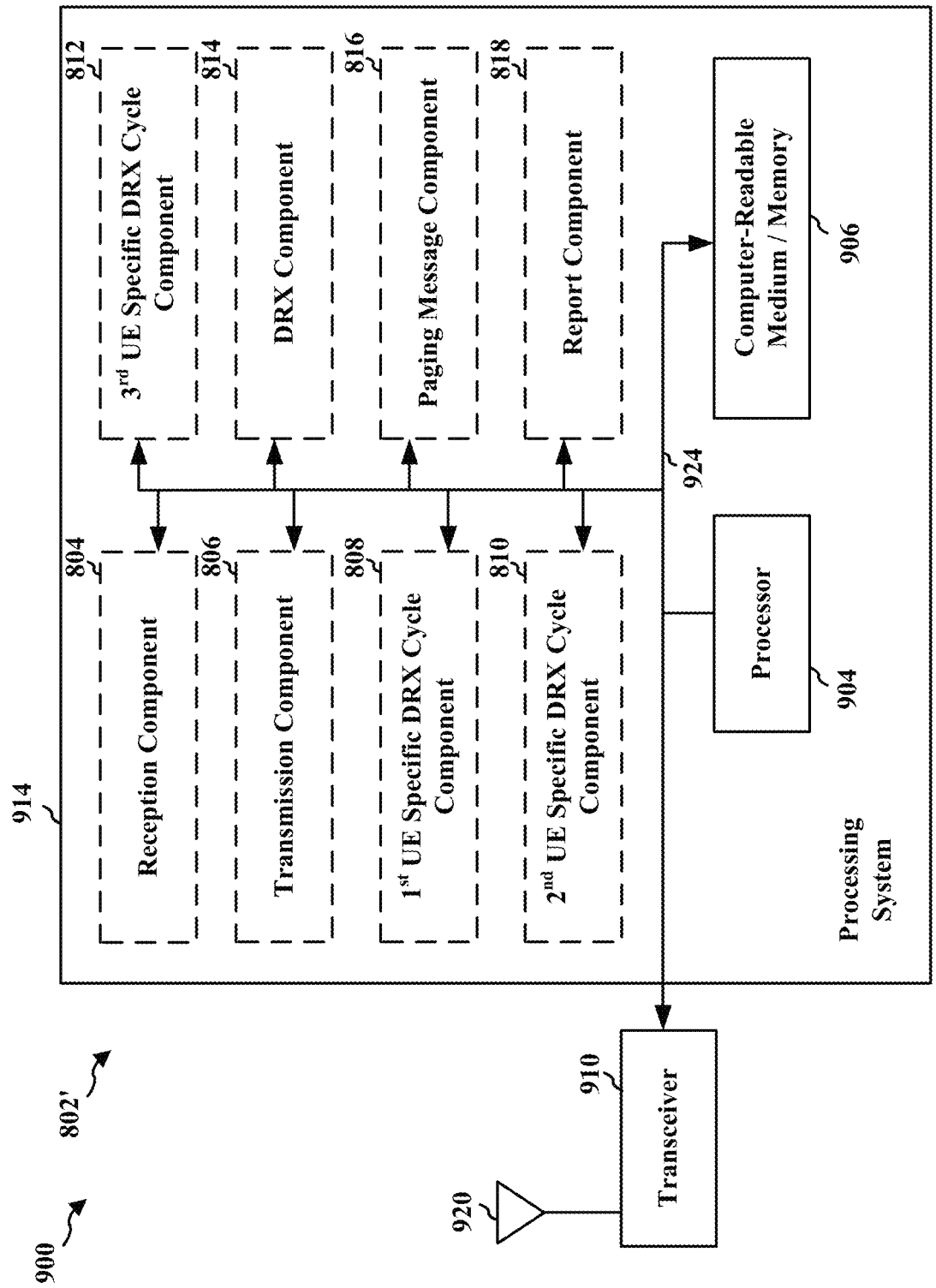
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359. Alternatively, the processing system 914 may be the entire UE (e.g., see 350 of FIG. 3).

In one configuration, the apparatus 802/802' for wireless communication includes means for selecting a UE specific DRX cycle from among a first set of UE specific DRX cycles if the UE is operating in a non-CE mode; means for selecting the UE specific DRX cycle from among a second set of UE specific DRX cycles if the UE is operating in a first CE mode, wherein the second set of UE specific DRX cycles is different than the first set of UE specific DRX cycles; means for monitoring for a paging message based on the UE specific DRX cycle selected by the UE; means for selecting the UE specific DRX cycle from among a third set of UE specific DRX cycles if the UE is operating in a second CE mode, wherein the third set of UE specific DRX cycles is different than the second set of UE specific DRX cycles; means for applying the UE specific DRX cycle from the first set of UE specific DRX cycles if the UE is operating in the non-CE mode, applying the UE specific DRX cycle from the second set of UE specific DRX cycles if the UE reported support for the first CE mode and the UE is operating in the CE mode, and applying the UE specific DRX cycle from the third set of UE specific DRX cycles if the UE reported support for the second CE mode and the UE is operating in the CE mode; and means for reporting a single UE specific DRX cycle to a network. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Accordingly, the present disclosure allows a base station and UE to apply a UE specific DRX cycle for paging, from a set of DRX cycles, when the UE is operating in non-CE mode, while also allowing the base station and UE to apply another UE specific DRX cycle for paging, from a different set of DRX cycles, when the UE is operating in a CE mode (e.g. CE Mode A or B). For example, when the UE is operating in non-CE mode, the UE and base station may select a UE specific DRX cycle for paging from a first set of UE specific DRX cycles, while if the UE supports and is operating in a first or second CE mode, the UE and base station may select a UE specific DRX cycle for paging from a second or third set of UE specific DRX cycles used for the CE modes. Thus, eMTC UEs may apply shorter UE specific DRX cycles (e.g. 32, 64, or 128 subframes) when operating in non-CE mode, where paging repetitions may not be necessary, while restricting the use of these UE specific DRX cycles in CE mode, where paging repetitions may be used.

Figure 10:
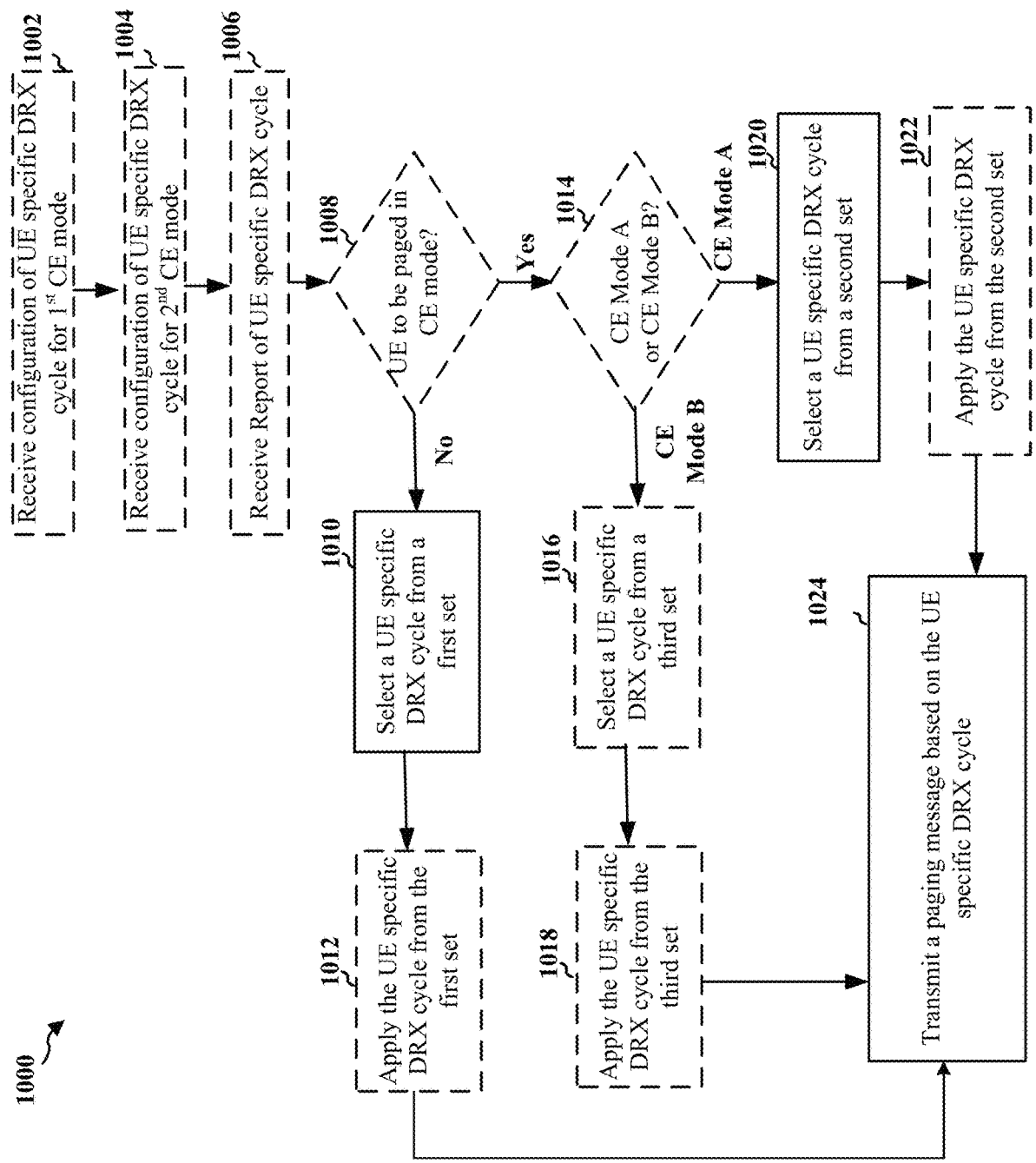
FIG. 10 is a flowchart of a method of wireless communication.

FIG. 10 is a flowchart 1000 of a method of wireless communication. The method may be performed by a base station (e.g., base station 102, 180, 310, 402, 602, 850, the apparatus 1102/1102'; the processing system 1214, which may include the memory 376 and which may be the entire base station 310 or a component of the base station 310, such as the TX processor 316, the RX processor 370, and/or the controller/processor 375). The base station may communicate with a UE, e.g., based on eMTC. Optional aspects of the method are illustrated with a dashed line. The method improves the ability of a base station to select a UE specific DRX cycle for paging a UE by using different UE specific DRX cycle sets based on whether the UE is to be paged in non-CE mode, CE mode A, or CE mode B.

The base station may determine, at 1008, whether a UE is to be paged in a CE mode or a non-CE mode. FIG. 4 illustrates an example of UEs that are operating in non-CE mode, CE mode A, or CE mode B. For instance, referring to FIG. 6B, a UE operating in non-CE mode may switch to CE mode when it moves farther from the base station and may switch back to non-CE mode when it moves closer to the base station. Thus, the base station may determine that the UE is operating in a non-CE mode when the UE is closer to the base station (e.g. in normal cell coverage 410) or operating in a CE mode when the UE is farther from the base station (e.g. in extended cell coverages 412 or 414), e.g., as identified from a prior Attach Request or Tracking Area Update request received from the UE. The base station may also determine how to page each UE based on the UE's indication of its support for a CE mode. In one aspect, if the UE reports that it only supports CE Mode (e.g. CE Mode A or CE Mode A+B), the base station assumes the UE is in CE mode and determines to page the UE on MPDCCH. The UE may subsequently monitor MPDCCH for paging. In another aspect, if the UE reports that it supports non-CE mode and CE mode, the base station may determine to page the UE on both PDCCH and MPDCCH. For example, the base station may determine to page the UE according to the UE's last known mode (i.e. on MPDCCH if CE mode, or on PDCCH if non-CE mode) and if the UE does not respond on that channel, the base station may determine to page the UE on the other channel. The base station may use the determination to select between multiple sets of UE specific DRX cycles for use in paging the UE. The selected UE specific DRX cycle may be used to determine a spacing between paging occasions, that in turn may affect the manner in which repetitions of a paging message are transmitted to the UE.

At 1010, the base station selects a UE specific DRX cycle from among a first set of UE specific DRX cycles if a UE is to be paged in a non-CE mode. For example, 1010 may be performed by first UE specific DRX cycle component 1108. The first set of UE specific DRX cycles may include cycles of 32 subframes, 64 subframes, 128 subframes, and 256 subframes. For example, FIG. 6A illustrates an example UE 604 in non-CE mode that may select and report a UE specific DRX cycle of 32 subframes, and the base station 602 selects (624) the UE's reported DRX cycle of 32 subframes for paging the UE, which was in the first set of subframes (e.g. 32, 64, 128, and 256) selected by the UE.

At 1020, the base station selects the UE specific DRX cycle from among a second set of UE specific DRX cycles if the UE is to be paged in a CE mode, where the second set of UE specific DRX cycles is different than the first set of UE specific DRX cycles. For example, 1020 may be performed by second UE specific DRX cycle component 1110. In one aspect, the second set may comprise at least one UE specific DRX cycle less than the first set of UE specific DRX cycles. In one example, if the first set comprises four cycles [32, 64, 128, 256], the second set may comprise three cycles [64, 128, 256]. In another example, the second set may be restricted to 128 and 256 or only to 256. In another aspect, the second set may comprise at least one UE specific DRX cycle different than the first set of UE specific DRX cycles, where the second set has the same number of UE specific DRX cycles as the first set. For example, if the first set comprises four cycles [32, 64, 128, 256], the second set may comprise four cycles [128, 128, 128, 256]. Thus, in either aspect, the second set of UE specific DRX cycles may comprise a restricted or limited set from among the larger first set of UE specific DRX cycles. Thus, the second set of UE specific DRX cycles may comprise one or more UE specific DRX cycles from among the first set of UE specific DRX cycles. For example, the second set of UE specific DRX cycles may comprise at least a longest UE specific DRX cycle from among the first set of UE specific DRX cycles. In FIGS. 6A and 6B, UEs 606 and 608 are operating in a CE mode, and the base station's selection of a UE specific DRX cycle is made from a more restrictive set of UE specific DRX cycles than for UE 604. For instance, base station 602 may select (632) UE 606's reported DRX cycle or a minimum value in the second set.

In addition to merely distinguishing between a CE mode and a non-CE mode for the UE, the base station may further distinguish between types of CE modes. Thus, at 1014, the base station may determine whether the UE is to be paged in a first CE mode, e.g., CE mode A, or a second CE mode, e.g., CE mode B. For example, referring to FIG. 6B, the base station may determine whether to configure the UE as CE mode A or B based on the UE's CE level 660 transmitted to the base station and/or based on the UE's position with respect to the base station (e.g. in extended cell coverage 412 or 414). The base station may also determine the CE mode based on the CE mode(s) which the UE supports (e.g. UE 606 only supports CE mode A). In FIGS. 6A and 6B, UE 606 is operating in CE mode A, whereas UE 608 is operating in CE mode B.

If the base station determines that the UE is to be paged in a first CE mode and the UE supports the first CE mode, the base station may select the UE specific DRX cycle from among the second set of UE specific DRX cycles, as illustrated at 1020. However, if the UE is to be paged in the CE mode and the UE supports a second CE mode, the base station selects the UE specific DRX cycle from among a third set of UE specific DRX cycles, at 1016. For example, 1016 may be performed by third UE specific DRX cycle component 1112. The third set of UE specific DRX cycles is different than the second set of UE specific DRX cycles. In one aspect, the third set may comprise at least one UE specific DRX cycle less than the second set of UE specific DRX cycles, for example, if the second set comprises [128, 256], the third set may comprise [256]. In another aspect, the third set may comprise at least one UE specific DRX cycle different than the second set of UE specific DRX cycles, for example, if the second set comprises [128, 128, 128, 256], the third set comprises [256, 256, 256, 256]. Thus, the third set of UE specific DRX cycles may comprise a further restricted/limited set from among the second set of UE specific DRX cycles. The third set of UE specific DRX cycles may comprise one or more UE specific DRX cycles from among the second set of UE specific DRX cycles. For example, the third set of UE specific DRX cycles may comprise a longest UE specific DRX cycle from among the second set of UE specific DRX cycles. In FIG. 6A, for example, base station 602 may select (646) UE 608's reported DRX cycle or a minimum value in the third set. UE 608 is operating in a CE mode B, and the selection of its UE specific DRX cycle (e.g. 621) is made from a more restrictive set of UE specific DRX cycles (e.g. 256) than for UE 606 (and UE 604).

At 1024, the base station transmits a paging message to the UE based on the UE specific DRX cycle selected by the UE. For example, 1024 may be performed by paging message component 1116. If the UE to be paged in a non-CE mode, the paging message may be sent once. If the UE is operating in a CE mode, e.g., either CE mode A or CE mode B, the paging message may include repetitions of the paging message. Repetitions of the paging message may be transmitted between paging occasions, the paging occasions being spaced in time based on the selected UE specific DRX cycle. Thus, in FIGS. 6A and 6B, the base station 602 may transmit the PO 626 to UE 604 once (e.g. without repetitions) because the UE is operating in non-CE mode. However, the base station may respectively transmit POs 634, 648 to UEs 606, 608 in CE mode with repetitions 636, 650 spaced from each other according to the UEs' respective DRX cycles 617, 621.

As illustrated at 1006, the base station may receive, from a network, a report of a UE specific DRX cycle. For example, 1006 may be performed by report component 1118. The information may be provided from the network to the base station, as described in connection with FIGS. 6A and 6B. A base station may use the reported UE specific DRX cycle to page the UE, dependent on whether the UE is to be paged in a CE mode or a non-CE mode. For example, in FIG. 6A, UEs 604, 606, 608 may respectively report their DRX cycles at 611, 615, and 619 to the MME 603, which in turn provides this information to the base station 602 to send POs to the UEs as described above. The report may comprise a single UE specific DRX cycle. For example, the report received at 1006 may comprise at least one UE specific DRX cycle from the first set of UE specific DRX cycles that is not comprised in the second set of UE specific DRX cycles. For example, referring to FIG. 6A, the DRX cycle reported by UE 606 may not be in the second set, and so the base station may instead select (632) a minimum value in the second set. The UE may monitor for the paging message based on a first UE specific DRX cycle from the first set of UE specific DRX cycles when the UE operates in the non-CE mode, and the UE may monitor for the paging message and repetitions of the paging message based on a second UE specific DRX cycle that is limited to the second set of UE specific DRX cycles when the UE operates in the CE mode.

The base station may receive additional information from the network that assists the base station in determining which UE specific DRX cycle to apply. For example, at 1002, the base station may receive, from a network, a first configuration of a first UE specific DRX cycle from among the second set of UE specific DRX cycles for a first CE mode, and at 1004, the base station may receive, from the network, a second configuration of a second UE specific DRX cycle from among the third set of UE specific DRX cycles for a second CE mode. For example, 1002 and 1004 may each be performed by configuration component 1120. For instance, referring to FIGS. 6A and 6B, base station 602 may receive a first configuration (e.g. configuration 607) from the MME 603 indicating a UE-specific DRX cycle to apply from the second set, and the base station may receive a second configuration (e.g. configuration 609) from the MME 603 indicating a UE-specific DRX cycle to apply from the third set. Then, the base station may apply, e.g., at 1022, the first UE specific DRX cycle if the UE is operating in the first CE mode and apply the second UE specific DRX cycle, e.g., at 1018, if the UE is operating in the second CE mode. If the UE is to be paged in a non-CE mode, the base station may apply a UE DRX cycle selected from among the first set of UE specific DRX cycles, at 1012. For example, 1012, 1018, and 1022 may each be performed by DRX component 1114. For instance, in FIG. 6A, base station 602 may apply a selected (624) DRX cycle from the first set when paging UE 604, e.g. by transmitting a paging message (e.g. PO 626) to UE 604 according to the selected DRX cycle. Moreover, the base station may apply a selected (632) DRX cycle from the second set when paging UE 606, and the base station may apply a selected (646) DRX cycle from the third set when paging UE 608, e.g., by respectively transmitting a paging message (e.g. PO 634 or 648) to UE 606 according to the selected DRX cycle including repetitions 636, 650 of the POs spaced in time to accommodate the selected DRX cycle.

Figure 11:
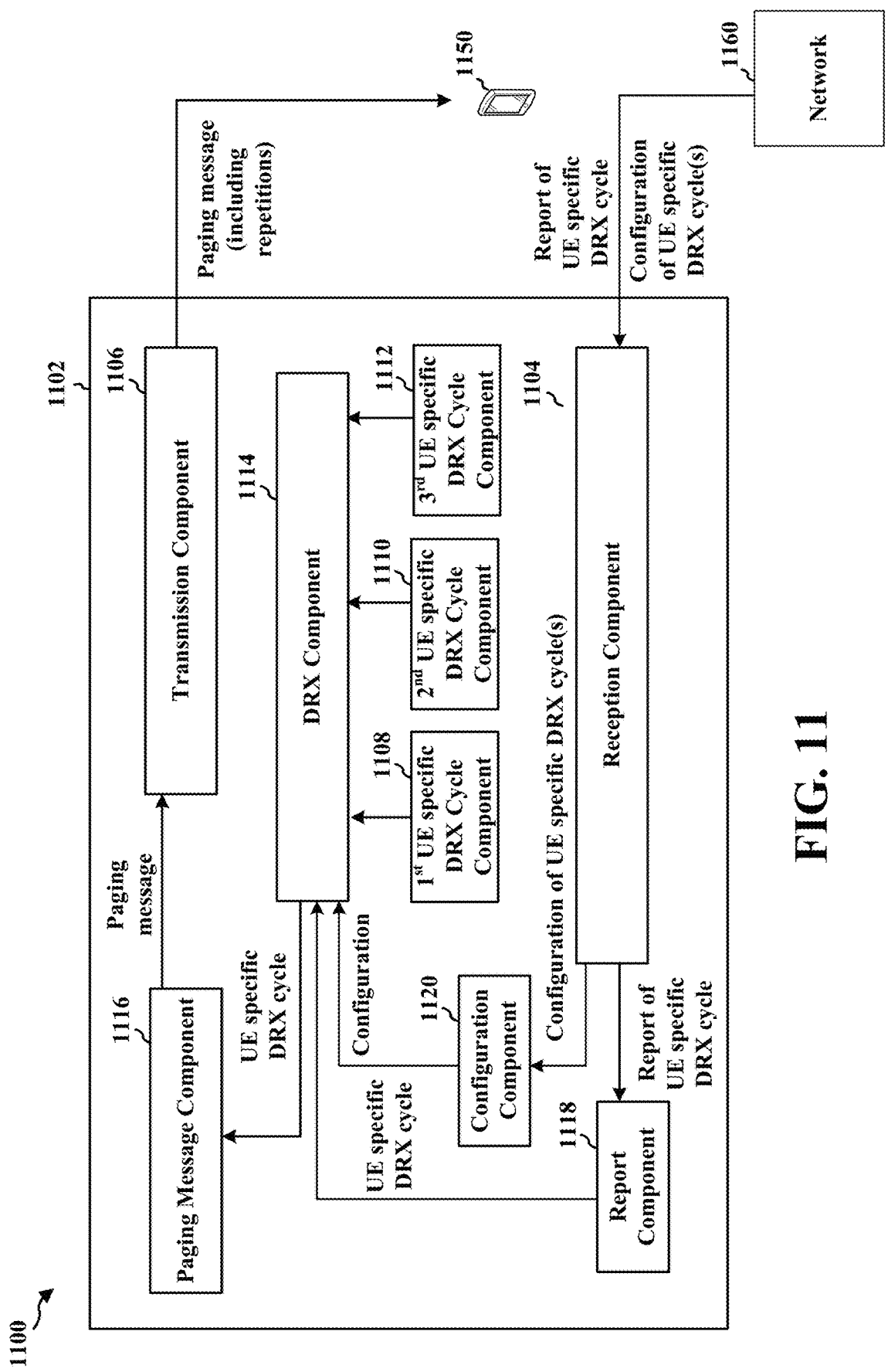
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a base station (e.g., base station 102, 180, 310, 402, 602, 850).

The apparatus includes a reception component 1104 configured to receive uplink communication from UE(s) 1150 and/or to receive communication from a network 1160. The apparatus includes a transmission component 1106 configured to transmit downlink communication to the UE(s) 1150. The apparatus includes a first UE specific DRX cycle component 1108 configured to select a UE specific DRX cycle from among a first set of UE specific DRX cycles if a UE is to be paged in a non-CE mode. The apparatus includes a second UE specific DRX cycle component 1110 configured to select the UE specific DRX cycle from among a second set of UE specific DRX cycles if the UE is to be paged in a CE mode, wherein the second set of UE specific DRX cycles comprises at least one UE specific DRX cycle less than the first set of UE specific DRX cycles. The apparatus may include a third UE specific DRX cycle component 1112 configured to select the UE specific DRX cycle from among a third set of UE specific DRX cycles if the UE is to be paged in the CE mode and the UE supports a second CE mode, wherein the third set of UE specific DRX cycles comprises at least one UE specific DRX cycle less than the second set of UE specific DRX cycles. The apparatus includes a paging message component 1116 configured to transmit a paging message to the UE based on the UE specific DRX cycle selected by the UE. The apparatus may include a report component 1118 configured to receive, from a network, a report of a UE specific DRX cycle, e.g., a single UE specific DRX cycle, at least one UE specific DRX cycle from the first set of UE specific DRX cycles that is not comprised in the second set of UE specific DRX cycles, etc.

The apparatus may include a configuration component 1120 configured to receive, from a network, a first configuration of a first UE specific DRX cycle from among the second set of UE specific DRX cycles for a first CE mode and a second configuration of a second UE specific DRX cycle from among the third set of UE specific DRX cycles for a second CE mode. The apparatus may include a DRX component 1114 configured to apply the selected UE specific DRX cycle. For example, the DRX component may apply the first UE specific DRX cycle if the UE is operating in the first CE mode and apply the second UE specific DRX cycle if the UE is operating in the second CE mode.

The apparatus may include additional components that perform each of the blocks of the algorithm in the aforementioned flowcharts of FIGS. 6A, 6B, and 10. As such, each block in the aforementioned flowcharts of FIGS. 6A, 6B, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
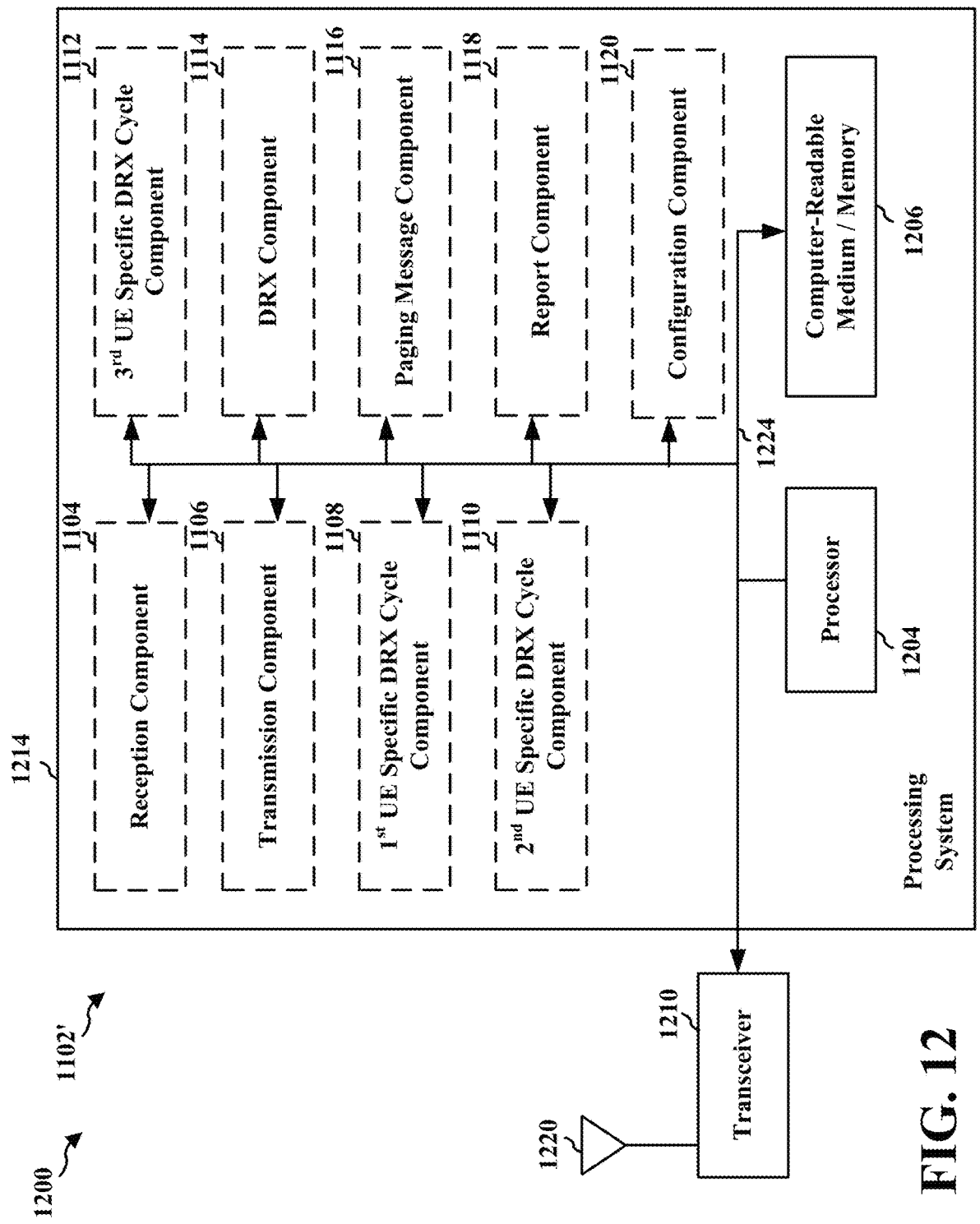
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120. The components may be software components running in the processor 1204, resident/stored in the computer readable medium/memory 1206, one or more hardware components coupled to the processor 1204, or some combination thereof. The processing system 1214 may be a component of the base station 310 and may include the memory 376 and/or at least one of the TX processor 316, the RX processor 370, and the controller/processor 375. Alternatively, the processing system 1214 may be the entire base station (e.g., see 310 of FIG. 3).

In one configuration, the apparatus 1102/1102' for wireless communication includes means for selecting a UE specific DRX cycle from among a first set of UE specific DRX cycles if a UE is to be paged in a non-CE mode; means for selecting the UE specific DRX cycle from among a second set of UE specific DRX cycles if the UE is to be paged in a CE mode, wherein the second set of UE specific DRX cycles is different than the first set of UE specific DRX cycles; means for transmitting a paging message to the UE based on the UE specific DRX cycle selected by the UE; means for selecting the UE specific DRX cycle from among a third set of UE specific DRX cycles if the UE is to be paged in the CE mode and the UE supports a second CE mode, wherein the third set of UE specific DRX cycles is different than the second set of UE specific DRX cycles; means for receiving, from a network, a report of a single UE specific DRX cycle; means for receiving, from a network, a report of at least one UE specific DRX cycle from the first set of UE specific DRX cycles that is not comprised in the second set of UE specific DRX cycles; means for receiving, from a network, a first configuration of a first UE specific DRX cycle from among the second set of UE specific DRX cycles for a first CE mode and a second configuration of a second UE specific DRX cycle from among the third set of UE specific DRX cycles for a second CE mode; and means for applying the first UE specific DRX cycle if the UE is operating in the first CE mode and applying the second UE specific DRX cycle if the UE is operating in the second CE mode. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Therefore, the present disclosure allows eMTC UEs to report and apply certain UE specific DRX cycles under non-CE mode, while also allowing these UEs to change their DRX cycle to one from a more restricted set of cycles when operating in CE mode. Similarly, the present disclosure allows the base station to receive the reported UE specific DRX cycle and apply that cycle for paging non-CE mode UEs, while applying a different DRX cycle from a more restricted set of cycles for paging CE-mode UEs. As no additional signaling (e.g. registration updates) is exchanged between the UE and the base station for changing the UE specific DRX cycle, the present disclosure saves UE power consumption and signaling load. Moreover, as the base station and UE apply the same DRX cycle, the base station and UE continue to remain synchronized. Consequently, the likelihood of abnormal paging operation as illustrated in FIG. 5B may be reduced.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   selecting a UE specific Discontinuous Reception (DRX) cycle from among a first set of UE specific DRX cycles if the UE is operating in a non-Coverage Enhanced (non-CE) mode;
   selecting the UE specific DRX cycle from among a second set of UE specific DRX cycles if the UE is operating in a Coverage Enhanced (CE) mode, wherein the second set of UE specific DRX cycles is different than the first set of UE specific DRX cycles, one UE specific DRX cycle in the second set of UE specific DRX cycles corresponds to a longest UE specific DRX cycles in the first set of UE specific DRX cycles or is longer than any UE specific DRX cycle in the first set of UE specific DRX cycles, and any remaining, zero or more, UE specific DRX cycles in the second set of UE specific DRX cycles are longer than the longest UE specific DRX cycles in the first set of UE specific DRX cycles; and monitoring for a paging message based on the UE specific DRX cycle selected by the UE.

2. The method of claim 1, wherein the second set of UE specific DRX cycles comprises one or more UE specific DRX cycles from among the first set of UE specific DRX cycles.

3. The method of claim 1, wherein the second set of UE specific DRX cycles comprises a longest UE specific DRX cycle from among the first set of UE specific DRX cycles.

4. The method of claim 1, further comprising:
reporting a single UE specific DRX cycle to a network.

5. The method of claim 1, wherein monitoring for the paging message comprises accumulating repetitions of the paging message between paging occasions according to the UE specific DRX cycle selected by the UE.

6. The method of claim 1, wherein the second set of UE specific DRX cycles comprises at least one UE specific DRX cycle less than or different than the first set of UE specific DRX cycles.

7. The method of claim 1, wherein the CE mode comprises a first CE mode, the method further comprising:
selecting the UE specific DRX cycle from among a third set of UE specific DRX cycles if the UE is operating in a second CE mode, wherein the third set of UE specific DRX cycles is different than the second set of UE specific DRX cycles.

8. The method of claim 7, further comprising:
applying the UE specific DRX cycle from the first set of UE specific DRX cycles if the UE is operating in the non-CE mode;
applying the UE specific DRX cycle from the second set of UE specific DRX cycles if the UE reported support for the first CE mode and the UE is operating in the CE mode; and
applying the UE specific DRX cycle from the third set of UE specific DRX cycles if the UE reported support for the second CE mode and the UE is operating in the second CE mode.

9. The method of claim 7, wherein the third set of UE specific DRX cycles comprises one or more UE specific DRX cycles from among the second set of UE specific DRX cycles.

10. The method of claim 7, wherein the third set of UE specific DRX cycles comprises a longest UE specific DRX cycle from among the second set of UE specific DRX cycles.

11. The method of claim 7, wherein the third set of UE specific DRX cycles comprises at least one UE specific DRX cycle less than or different than the second set of UE specific DRX cycles.

12. An apparatus for wireless communication at a User Equipment (UE), comprising:
a memory; and
at least one processor coupled to the memory and configured to:
select a User Equipment (UE) specific Discontinuous Reception (DRX) cycle from among a first set of UE specific DRX cycles if the UE is operating in a non-Coverage Enhanced (non-CE) mode;
select the UE specific DRX cycle from among a second set of UE specific DRX cycles if the UE is operating in a Coverage Enhanced (CE) mode, wherein the second set of UE specific DRX cycles is different than the first set of UE specific DRX cycles, one UE specific DRX cycle in the second set of UE specific DRX cycles corresponds to a longest UE specific DRX cycles in the first set of UE specific DRX cycles or is longer than any UE specific DRX cycle in the first set of UE specific DRX cycles, and any remaining, zero or more, UE specific DRX cycles in the second set of UE specific DRX cycles are longer than the longest UE specific DRX cycles in the first set of UE specific DRX cycles; and
monitor for a paging message based on the UE specific DRX cycle selected by the UE.

13. The apparatus of claim 12, wherein the second set of UE specific DRX cycles comprises one or more UE specific DRX cycles from among the first set of UE specific DRX cycles, wherein the at least one processor is further configured to:
report a single UE specific DRX cycle to a network.

14. The apparatus of claim 12, wherein the CE mode comprises a first CE mode, wherein the at least one processor is further configured to:
select the UE specific DRX cycle from among a third set of UE specific DRX cycles if the UE is operating in a second CE mode, wherein the third set of UE specific DRX cycles is different than the second set of UE specific DRX cycles.

15. The apparatus of claim 14, wherein the at least one processor is further configured to:
apply the UE specific DRX cycle from the first set of UE specific DRX cycles if the UE is operating in the non-CE mode;
apply the UE specific DRX cycle from the second set of UE specific DRX cycles if the UE reported support for the CE mode and the UE is operating in the CE mode; and
apply the UE specific DRX cycle from the third set of UE specific DRX cycles if the UE reported support for the second CE mode and the UE is operating in the second CE mode.

16. The apparatus of claim 14, wherein the third set of UE specific DRX cycles comprises one or more UE specific DRX cycles from among the second set of UE specific DRX cycles.

17. The apparatus of claim 14, wherein the third set of UE specific DRX cycles comprises a longest UE specific DRX cycle from among the second set of UE specific DRX cycles.

18. The apparatus of claim 14, wherein the third set of UE specific DRX cycles comprises at least one UE specific DRX cycle less than or different than the second set of UE specific DRX cycles.

19. The apparatus of claim 12, wherein the second set of UE specific DRX cycles comprises one or more UE specific DRX cycles from among the first set of UE specific DRX cycles.

20. The apparatus of claim 12, wherein the second set of UE specific DRX cycles comprises a longest UE specific DRX cycle from among the first set of UE specific DRX cycles.

21. The apparatus of claim 12, wherein monitoring for the paging message comprises accumulating repetitions of the paging message between paging occasions according to the UE specific DRX cycle selected by the UE.

22. The apparatus of claim 12, wherein the second set of UE specific DRX cycles comprises at least one UE specific DRX cycle less than or different than the first set of UE specific DRX cycles.

23. An apparatus for wireless communication at a User Equipment (UE), comprising:
means for selecting a UE specific Discontinuous Reception (DRX) cycle from among a first set of UE specific DRX cycles if the UE is operating in a non-Coverage Enhanced (non-CE) mode;

means for selecting the UE specific DRX cycle from among a second set of UE specific DRX cycles if the UE is operating in a Coverage Enhanced (CE) mode, wherein the second set of UE specific DRX cycles is different than the first set of UE specific DRX cycles, one UE specific DRX cycle in the second set of UE specific DRX cycles corresponds to a longest UE specific DRX cycles in the first set of UE specific DRX cycles or is longer than any UE specific DRX cycle in the first set of UE specific DRX cycles, and any remaining, zero or more, UE specific DRX cycles in the second set of UE specific DRX cycles are longer than the longest UE specific DRX cycles in the first set of UE specific DRX cycles; and means for monitoring for a paging message based on the UE specific DRX cycle selected by the UE.

24. The apparatus of claim 23, wherein the second set of UE specific DRX cycles comprises one or more UE specific DRX cycles from among the first set of UE specific DRX cycles.

25. The apparatus of claim 23, wherein the second set of UE specific DRX cycles comprises a longest UE specific DRX cycle from among the first set of UE specific DRX cycles.

26. The apparatus of claim 23, further comprising:
means for reporting a single UE specific DRX cycle to a network.

27. The apparatus of claim 23, wherein monitoring for the paging message comprises accumulating repetitions of the paging message between paging occasions according to the UE specific DRX cycle selected by the UE.

28. The apparatus of claim 23, wherein the CE mode comprises a first CE mode, the apparatus further comprising:
means for selecting the UE specific DRX cycle from among a third set of UE specific DRX cycles if the UE is operating in a second CE mode, wherein the third set of UE specific DRX cycles is different than the second set of UE specific DRX cycles.

29. The apparatus of claim 28, further comprising:
means for applying the UE specific DRX cycle from the first set of UE specific DRX cycles if the UE is operating in the non-CE mode;
means for applying the UE specific DRX cycle from the second set of UE specific DRX cycles if the UE reported support for the first CE mode and the UE is operating in the CE mode; and
means for applying the UE specific DRX cycle from the third set of UE specific DRX cycles if the UE reported support for the second CE mode and the UE is operating in the second CE mode.

30. A computer-readable medium storing computer executable code at a User Equipment (UE), the code when executed by a processor causes the processor to:
select a UE specific Discontinuous Reception (DRX) cycle from among a first set of UE specific DRX cycles if the UE is operating in a non-Coverage Enhanced (non-CE) mode;
select the UE specific DRX cycle from among a second set of UE specific DRX cycles if the UE is operating in a Coverage Enhanced (CE) mode, wherein the second set of UE specific DRX cycles is different than the first set of UE specific DRX cycles, one UE specific DRX cycle in the second set of UE specific DRX cycles corresponds to a longest UE specific DRX cycles in the first set of UE specific DRX cycles or is longer than any UE specific DRX cycle in the first set of UE specific DRX cycles, and any remaining, zero or more, UE specific DRX cycles in the second set of UE specific DRX cycles are longer than the longest UE specific DRX cycles in the first set of UE specific DRX cycles; and
monitor for a paging message based on the UE specific DRX cycle selected by the UE.

* * * * *